United States Patent [19]
Anderson, II et al.

[11] Patent Number: 5,909,544
[45] Date of Patent: *Jun. 1, 1999

[54] AUTOMATED TEST HARNESS

[75] Inventors: Micheil M. Anderson, II, Orem; Howard K. Bangerter, Highland; Marlon T. Borup, Orem; James E. Byer, American Fork; Darin L. Cable, Spanish Fork; Ross W. Doxey, Orem; Richard S. Graham, Springville; Todd D. Hale, American Fork; Britt J. Hawley; Richard W. Lamplugh, both of Orem; Rick L. Pray, Woodland Hills, all of Utah

[73] Assignee: Novell Inc., Provo, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/518,160

[22] Filed: Aug. 23, 1995

[51] Int. Cl.$^6$ .................................................. G06F 13/00
[52] U.S. Cl. ............................... 395/200.38; 395/200.47; 395/200.5; 395/712
[58] Field of Search ...................... 395/183.03, 183.14, 395/712, 200.47, 200.49, 200.5, 200.51, 200.52, 200.38, 200.39, 200.41

[56] References Cited

U.S. PATENT DOCUMENTS

| | | | |
|---|---|---|---|
| 5,021,997 | 6/1991 | Archie et al. | 395/183.07 |
| 5,157,782 | 10/1992 | Tuttle et al. | 395/575 |
| 5,218,605 | 6/1993 | Low et al. | 371/16 |
| 5,313,616 | 5/1994 | Cline et al. | 395/500 |
| 5,315,711 | 5/1994 | Barone et al. | 395/200.38 |
| 5,335,342 | 8/1994 | Pope et al. | 395/575 |
| 5,371,883 | 12/1994 | Gross et al. | 395/575 |
| 5,388,211 | 2/1995 | Hornbuckle | 395/712 |
| 5,630,049 | 5/1997 | Cardoza et al. | 395/183.01 |
| 5,671,414 | 9/1997 | Nicolet | 395/684 |
| 5,684,952 | 11/1997 | Stein | 395/712 |
| 5,805,897 | 9/1998 | Glowny | 395/712 |

*Primary Examiner*—Meng-Al T. An
*Assistant Examiner*—Walter D. Davis, Jr.
*Attorney, Agent, or Firm*—Madson & Metcalf

[57] ABSTRACT

An apparatus and method for temporarily slaving and configuring a plurality of hardware resources such as computers, microprocessor-based devices, and the like, over a network, and then emancipating the resources to operate independently. Resources or targets may be enslaved at an operating system level. A controller may configure a plurality of hardware resources such as computers, microprocessor-based devices, and the like, to operate autonomously over a network. Resources or targets may be enslaved at an operating system level, configured with commands from a controller, and emancipated to operate independently. Emancipated resources may download applications, read and write files, communicate with other devices, and otherwise operate as independent computers. Data corresponding to test instructions may be downloaded from, and data corresponding to results may be recorded and saved on, a network server by a resource operating independently. Upon completion of a test or a series of tests, a resource may again report back to a controller, be enslaved and reconfigured, and be emancipated to operate other test software.

27 Claims, 6 Drawing Sheets

AUTOMATED TEST HARNESS

BACKGROUND

1. The Field of the Invention

This invention relates to computer networks and, more particularly, to novel systems and methods for temporarily slaving operating systems of a plurality of processors for configuration purposes or for downloading software, and then later emancipating these slaved devices (e.g. computers, microprocessor-based devices, instruments, etc.) to operate independently, including running software, downloading files, and uploading files over the network.

2. The Background Art

Networking typically involves several microprocessor-based devices (nodes) exchanging data with one another over a transmission medium, a communication link such as, for example, a hard wire, fiberoptic cable, radio frequency transmitter/receiver, or other physical communication mechanism. A link between a node and a network or between routers of a wide area network (WAN) may be wireless. Network cards provide a mechanical and data connection between the communication link (e.g. fiberoptic, wire, or wireless) and the processor of the node or device to be connected to the network. Communication may occur by various protocols (rules), with steps (activities) executed by devices satisfying those protocols.

Networks may be defined at several levels of grouping and communication. For convenience, the terms primary, secondary and tertiary network are used here to indicate the extent and complexity of a network. A primary network is the most fundamental connecting of two nodes in some manner. A local area network (LAN) may be thought of as a primary network. A secondary network is a routed network, one including at least two primary networks connected by a router for forwarding messages between the primary networks. A tertiary network (sometimes called an internetwork) is one including two primary or secondary networks, a router in one being separated by an intermediate network from a router in the other. Thus, as the name network implies, a tertiary network can extend from router to router to router via intervening primary networks virtually forever, within the constraints of the laws of electrophysics and communications protocols.

A server is a computer connected to a network via a network card and programmed to act as a traffic manager and storage device for files of data being transmitted over the network by the various connected nodes. A hard wire interconnected to a group of network cards with attached computers, with one of those computers acting as a server, is a typical network. In other networks, every device may be a server.

Computer networks are capable of facilitating many functions, but not certain other functions. For example, as computer network technology has grown, so has the need to pass information over the networks.

Likewise, a user at each node, typically, must configure the node, from physically connecting hardware and loading an operating system of the processor to loading an application and instructing the application how to store and retrieve data representing information. A high degree of automation of tasks normally done by users is not typically available between devices (nodes) across networks. One command line at a time is typically required to be sent and responded to.

Unfortunately, a user logging a controller computer on to a network cannot automatically download executables to a remote, general-purpose, computer for execution. The remote computer must be logged on and configured by the user just as any other computer.

Similarly, a slaved computer may be logged on to a network, configured, loaded with an application and then enslaved to communicate with a master to receive information from a master for use by an application previously launched on the slave computer. Instructions and responses are typically on a command-by-command basis.

Configuration may be thought of as programming a slave with executable codes, and providing information for establishing connections and protocols, identifying other devices to be addressed, identifying a server and possibly a router, providing the address of the slave to the network server, and so forth. Thus, once configured, a node (e.g. computer or other processor-based device on a network) may send and receive messages. Also, once an application has been launched (loaded and instructed to run), the slave may send and receive information related to the application. However, if a slave is basically a general purpose processor with an operating system and memory, or optionally including a storage device, it must be manually loaded with software and instructed to run by a user before communicating with a master.

What is needed is a system that enables a controller to act as a user or otherwise take control of a processor to instruct it. For example, a processor needs to be controlled long enough to be instructed to download "executables," (files containing a coded instruction capable of being "understood" by an operating system of a processor to result in an operable instruction executable by the processor), and to launch (run) the executables. Slaving an operating system and configuring the host (remote computer) need to be followed by a high degree of independent operation by the remote computer.

A scheme is needed for slaving and configuring, followed by downloading entire executables to a general purpose computer, that is, a target, located remotely from a controller, particularly over a network. For example, a controller may need to automatically perform all tasks normally required of a user seated at a keyboard associated with the target. For example, a user boots up a computer with some operating system, logs on to a network, navigates through a hierarchy of directories, locates and loads an executable file, and runs the "executable." For systems having an input/output (I/O) interface for dealing with humans, great utility may be obtained by providing for a remote computer to replace the user, thus providing automation of many manual tasks associated with setting up a computer, running software, and managing files.

Similarly, for processor-based apparatus having I/O interfaces embedded, without user interfaces as monitors and keyboards, great utility could be obtained by providing for automatic access to the operating system by a remote computer across a network. For example, automatic loading of executables from a remote computer, automatic upgrading, and any similar task accessing the operating system of a microprocessor-based device on a network could make management and upgrading of such devices tractable on a large scale.

Likewise, the need may be for downloading information to the memory of a device by which the device may operate a resident executable. For example, when a single computer connects to several peripheral devices, the single computer typically may control those various devices directly. Also, a controlling computer may simply provide data corresponding to responses, commands, or information needed by an application running on a slaved computer. However a need exists for autonomous devices to be temporarily accessed remotely with data for controlling or supporting resident executables, after which the devices return to their autonomous operating condition. The need, when compared with the conventional term "slaved computer" is for an "emancipated computer" that may be temporarily and remotely enslaved at an operating system level, configured, and emancipated to operate independently over the network. The emancipated computer or other device needs to be able to access files of input information or load itself with an executable, or launch an executable, after which it may report back to a master to be enslaved again, and reconfigured to operate again as an emancipated device.

A system is needed that is transparent to a user for tracking large numbers of such emancipated slave computers. Thus, a system is needed that will facilitate a controller accessing numerous resources (computers), monitoring their capabilities, taking temporary control of any available one, commanding the selected resource to configure itself, load and run software, and pass input and output information properly, and report to the controller when it is again available to be assigned another project. Again, single commands with reporting back for another command are not the intention. What is needed is true emancipation, maximizing the use of the emancipated slave resource, with minimum necessity for control by the controller, while at the same time permitting the controller to communicate with the resource at an operating system level when needed. Thus a general purpose computer may be commanded to completely re-configure itself as needed without human intervention.

Thus maximum utility of all resources may be achieved by simply programming the logical options, defaults, backups for failed options, and the like, in order to keep all resources operating all the time with tasks that each can complete. Thus, regardless of processor, speed, memory, architecture or operating system, each resource needs to be able to be put to work effectively for every minute that it is available, without waiting for a user to monitor, schedule, and program the resource manually. All this capability over network can make possible testing systems having great speed, throughput, and flexibility from an assembly of any number of available resources of virtually any type. Moreover, human intervention may be only required at some minimal degree, yet a human operator could access the controller for information on the system status, results, and the like at any time.

BRIEF SUMMARY AND OBJECTS OF THE INVENTION

In view of the foregoing, it is a primary object of the present invention to provide a system for commanding resource computers to download test software and parametric data from a computer server (central repository) to the resource (test) computer or device selected from a plurality of resource computers over a primary, secondary, or tertiary network.

It is an object of the invention to provide a system for uploading and storing test result data from a test computer to a central repository on the network.

It is an object of the invention to automatically, according to a method transparent to a user, without requiring intervention by a user, manage a plurality of resource computers, over a network from a controlling computer, the startup and configuration of one or more test computers selected from the plurality of resource computers, transfer software files and parametric data files to the test computer or cause the test computer to download those files, provide surrogate commands to the test computers as if from a user or programming computer, and emancipate the test computer to operate the software of the software files and return result data corresponding to test data to a system database repository remote from the test computer.

It is an object of the invention to permit transfer of data by bit streams, files, fields, or entire databases.

It is an object of the invention to transfer data to a controller, or to a remote processor operating as a database manager, or directly to a database in a storage device, over a network, without requiring synchronous communication as in conventional master/slave systems, for example, without requiring that a master send an instruction to obtain each packet of information from a slave, or without requiring a master to do anything to enable a resource to complete a function and store data for access later by other computers, such as the controller.

It is an object of the invention to provide a system for tracking and scheduling of available resource computers connected in a network, including monitoring such parameters as, for example, the location, name, operating system, memory, speed, processor characteristics, memory capacity and other operational characteristics, of each resource computer, and using that information to allocate those resource computers to run applications, such as for example, test applications and collect data, such as test data.

It is an object of the invention to provide over a network a server (whether having a separate central processor, or time-sharing with the controller) for storing and retrieving files to be used temporarily by a controlling computer on the network and files to be loaded to and from a selected test (resource) computer of a plurality of resource computers connected to the network.

It is an object of the invention to provide database management, including an information format and designated fields to be stored in a database, for application, such as test applications, datafiles of parameters for controlling the test applications, and datafiles of test results obtained by running the test applications, all to be uploadable and downloadable over a network between a plurality of resource computers, a server, and a controller connected in a network.

It is an object of the invention to provide scheduling and queuing for a plurality of resource computers connected in a network, the resource computers being general purpose, program inable, digital computers, wherein application files of testing software, and parametric datafiles for operating the testing software are not required to be resident, but may be made available or downloaded by each selected, available, resource computer as prompted by a controlling computer connected to the network to communicate with the individual operating systems of the resource computers.

It is an object of the invention to provide resource management of a plurality of resource computers connected in a network according to the performance parameters of each resource, such as, for example, its memory, speed, processor characteristics, memory capacity and other operational characteristics.

It is an object of the invention to provide selection of a resource computer by a controller, loading and launching of applications by the resource computer under limited prompting or direction from the controller.

It is an object of the invention to provide a scheduler for selecting a test, having an application, from a queue of tests, selecting criteria for choosing a resource computer, and passing to a resource manager such criteria, and to provide a resource manager to track performance characteristics of a plurality of resource computers connected to a network, and to select a suitable resource computer for running the application based on the criteria, for example, by tracking each resource, and matching each resource at any given time with a selected application to run on that resource, the application being selected from a plurality of applications identified by the scheduler from the launch queue.

It is an object of the invention to provide a method for a resource manager to catalog and track a plurality of resource computers, for a launcher to configure a selected resource of the plurality of resource computers, for emancipating the selected resource to run alone, for the selected resource to load or have loaded on it an application, for receiving therefrom (such as by a controller or a server) data corresponding to test results generated by a test application in a suitable format for storing and retrieval.

It is an object of the invention to provide a method for configuring a plurality of resource computers remotely over a network by a controlling computer to load and run application software and create data corresponding to results generated by the application software for storage in a storage device, such as, for example, by transfer of a datafile from the application software to a server, or by transfer of data from the processor to the controller for logging into a database on a server, which may have a database manager operably connected thereto for managing datafiles.

It is an object of the invention to communicate over a network with the operating system of a general purpose computer, temporarily control the general purpose computer to configure it for running application software selected and downloaded by a controlling computer, and then emancipate the general purpose computer to operate substantially independently.

It is an object of the invention to provide for monitoring by a controller the availability and abilities of a plurality of resource computers, and for communication by the controller with the operating systems of individual resource computers over a network for configuring the resource computers, providing for loading and launching of application software thereon.

Consistent with the foregoing objects, and in accordance with the invention as embodied and broadly described herein, a test harness may include a controller, a slave or target, and a network interconnecting the master and one or more slaves. A test harness may also be thought of as a system of related software modules for controlling and managing the resources of a system of hardware components (such as computers) to render one processor a controller and another processor a slave at an operating system level.

A resource or target may be a computer controlled across a network as a slave during a setup procedure controlled by commands from the controller. The slave is thereafter emancipated to operate independently, capable of downloading and running software, reading and writing files, and the like, without direction or control from the controller. A computer may include a processor capable of hosting an operating system, with memory for temporary storage of data and instructions used by the processor during operation.

An operating environment, or simply environment, may be an operating system, such as, for example DOS, OS/2™, Windows™, and so forth. However, an environment may be another executable program operating within or under the operating environment hosted by a processor. By a "different" operating system is meant not a copy of an operating system running on a different processor, but an operating system using a programming structure, command system, protocol, combination of the foregoing, or the like, different from that of another operating system. For example DOS by Microsoft™ and Windows by Microsoft™, OS/2™, Macintosh™, Next Step™, are all separate, distinct, "different," operating systems for communicating with and controlling a processor, its associated memory, and possibly other devices such as a storage device over a bus of a computer.

A method and apparatus are disclosed in one embodiment of the present invention as including a network having a controller and a plurality of resources. An apparatus made in accordance with one embodiment of the invention may include a server, a database manager, a scheduler, a resource manager, a launcher, and a plurality of resources, each resource containing a processor and memory for hosting an application.

A method practiced in accordance with an embodiment of the invention may include tracking a plurality of resources, scheduling a plurality of applications having executables for controlling a processor and for providing data corresponding to operations of the processor, selecting a resource to host an application selected from the plurality of applications, configuring remotely over a network the selected resource, launching the application on the resource, running by the resource the application, providing output data from the resource, recording in a database for later retrieval the output data, and managing the database for identification and selection of the output data.

In one embodiment of an apparatus made in accordance with the invention, an apparatus for running test software may include a network for communicating data. A target may be operably connected to the network, the target comprising a first network interface, a first processor and a first memory device. The first processor may be programmable to host an operating system to communicate instructions to the first processor and to communicate data to and from the memory device. The first network interface may be operably connected to the first processor to communicate data between the first processor and the network;

A controller may be operably connected to the network to communicate data with the target over the network. The controller may include a second network interface and may be operably connected to the network to communicate data between the controller and the network. Likewise the controller may include a second processor operably connected to the second network interface for controlling the first processor's operating system.

The controller may include a second memory device for storing data communicated to and from the second processor, and a storage device for storing files. The files may include test applications containing instructions executable by the first processor, control applications containing instructions executable by the second processor, test datafiles containing data corresponding to test parameters used by the first processor in running the test applications, and result datafiles containing data corresponding to results obtained by the first processor while running test applications.

The apparatus may include software modules hosted on the controller. Modules may include a resource manager operable on the second processor for accumulating, tracking, and controlling storage of data corresponding to identification, performance characteristics, and availability of the target to run test applications. The resource manager may also service likewise a plurality of such targets.

The apparatus may include a server for storing and retrieving files, and a database manager for storing to and retrieving from a database records corresponding to data communicated between the first processor and the second processor. The apparatus may include a plurality of databases accessible by the database manager.

The controller may include a launcher in one or more instantiations for communicating with the operating system of the target. The launcher, or the target after configuration, may download selected applications and application (test) datafiles to the target. In general, another type of application may be substituted for a test application, an application datafile for a test datafile of inputs, and a result datafile for test result datafile. The controller may include a scheduler for acquiring data corresponding to a queue of tests to be run, selecting test applications to be loaded onto the target, and controlling matching of the test applications to the target.

The apparatus may include a plurality of targets, wherein each target of the plurality of targets may host an operating system different from the operating system of any or all other targets of the plurality of targets. The target (or each target of a plurality of targets) may include a storage device operably connected to the first processor for temporarily storing test datafiles, result datafiles, and test applications while running tests. The target may be programmed to host an operating system, and an environment operating under the operating system, (or on top of the operating system).

In general, when the term "test application" is used herein, the word "application" may be substituted. Although in one preferred embodiment, the apparatus and method may be used to automate the execution of software testing applications, the method and apparatus are equally valid for other software applications.

The apparatus may be arranged to have the second processor programmed with a plurality of software modules. For example, the plurality of software modules may include a server for storing and retrieving files, a database manager for storing and retrieving records from a plurality of databases corresponding to tests, suites of tests, groups of tests, suites, or other groups, target performance characteristics, test results, system parameters and errors, launchers and launches, status of targets, and the like communicated between the first processor and the second processor. Other modules may include a resource manager for tracking identification, characteristics, and availability of the target to run test applications, a launcher for communicating with the target and for initiating downloading, by the controller or the target, of selected test applications and test datafiles to the target, and a scheduler for acquiring data corresponding to a queue of tests to be run, selecting test applications to be loaded by the target, under direction of the launcher, and for spawning launchers as needed.

An apparatus may use processes and operational codes (opcodes) to provide a logical flow between processes, each process operating according to opcodes placed in a queue of the process by another process. Each process may be hosted on an individual device (computer, processor) alone, or several processes may be hosted on a single processor, timesharing the processor. This is one benefit of a multitasking operating system. An entire system (automated test harness) may be queue driven. Processes simply pass opcodes to queues of other processes. Each process may simply keep checking certain queues to determine whether anything needs to be done. When a process finds information in a queue, the process executes itself based upon the opcode found in the queue.

In general, an opcode may be a small data structure that may be passed from one process to a queue to be picked up by another process. Alternatively, an opcode may similarly pass from one thread to another thread of the same process. An opcode may include a block of memory allocated to contain a name, a pointer to identify other data structures needed by the particular opcode. For example, an opcode may invoke certain steps within a process. Those steps may expect certain information to be provided. That information may be provided in the data structure to which a pointer is pointing, addressing. In general, a data structure may be configured in a variety of ways.

A process may operate on data contained in a data structure, and then pass to another process (by means of an opcode) a pointer indicating that data structure. Thereafter, the other process may access the same data structure operating on, using, adding to, or deleting the information, or the like. Thus, an opcode may pass a pointer and data between multiple processes or threads during the running of an application.

Pointers may be chained. That is, a series of pointers may identify a series of next data structures. A data structure identified by a first pointer may in turn contain information interpreted as pointers. These pointers in the data structure, then, may point at, and thus chain to other data structures.

In an opcode as implemented in one preferred embodiment of an automated test harness in accordance with the invention, a generic first pointer may exist without practical limitation as to the nature of the data structure to which it points. By contrast, a second pointer may introduce a certain efficiency by pointing at a single, specific type of data structure. For example, the second pointer, by its very location in an opcode, may be bound to specific data that identifies its function. This may save process steps, and create processes by chaining opcodes, each data structure containing a pointer to the following data structure.

A method practiced in accordance with the invention may include a method of running test software on a plurality of targets, also called resources, processors, or computers. One may think of resources as hardware resources having the capability to host an operating system. The operating system may be enslaved and then emancipated by a master or controller. Emancipated means that a formerly enslaved resource's operating system is again rendered autonomous to operate independently of the master or controller.

The method may include operably connecting a target or resource to a network, the target comprising a first network interface, a first processor and a first memory device, the processor being programmable to host an operating system to communicate instructions to the processor and to communicate data to and from the memory device. The target's first network interface may be operably connected to the processor to communicate data between the processor and the network.

The method may include operably connecting a controller to the network to communicate with the target over the network. The controller may include a second network interface operably connected to the network to communicate data between the controller and the network. A second processor may be operably connected to the second network interface for controlling the operating system of the target.

A second memory device may be operably connected to the second processor for storing data communicated to and from the second processor, while a storage device may be connected for storing files.

The method may include loading by the target, at the instance of a launcher hosted on the controller to be in communication with an operating system hosted on the target, certain files, including executable files downloaded by the target from a server. These files may include test applications containing instructions executable by the first processor, test datafiles containing data corresponding to test parameters used by the first processor, and the like. Similarly, control applications containing instructions executable by the second processor may be downloaded by the controller.

The method may include running the test applications on the target, creating datafiles containing data corresponding to results obtained by the first processor while running the test applications. The method may also include uploading the datafiles of results to the server.

Temporary slaving may be accomplished by loading a slave module onto each target to operate on the operating system of the target, and a master module to operate on the operating system of controller. The slave module feeds back to the master module all data necessary for the master module to interact with the target's operating system as a user. Thus prompts, screens, and the like generated by the operating system of the target are communicated by the slave module to the master module of the controller. The master module is programmed to act based on data provided by the slave, sending instructions to the slave and commands for forwarding to the operating system of the target (resource).

The slave module receives executables from the master module, along with commands to be sent by the slave module to the command line of the operating system. Thus, the slave module is effectively provided with commands destined for the operating system, and is itself instructed to send the commands to the operating system for execution.

The temporary slaving operation may be conducted by any suitable software modules operating on the controller and the target. For example, a slaving program such as NCONTROL™ is a Novell™ slaving program that has been found suitable for facilitating the temporary slaving operation.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 6, is not intended to limit the scope of the invention, as claimed, but it is merely representative of the presently preferred embodiments of the invention.

Figure 1:
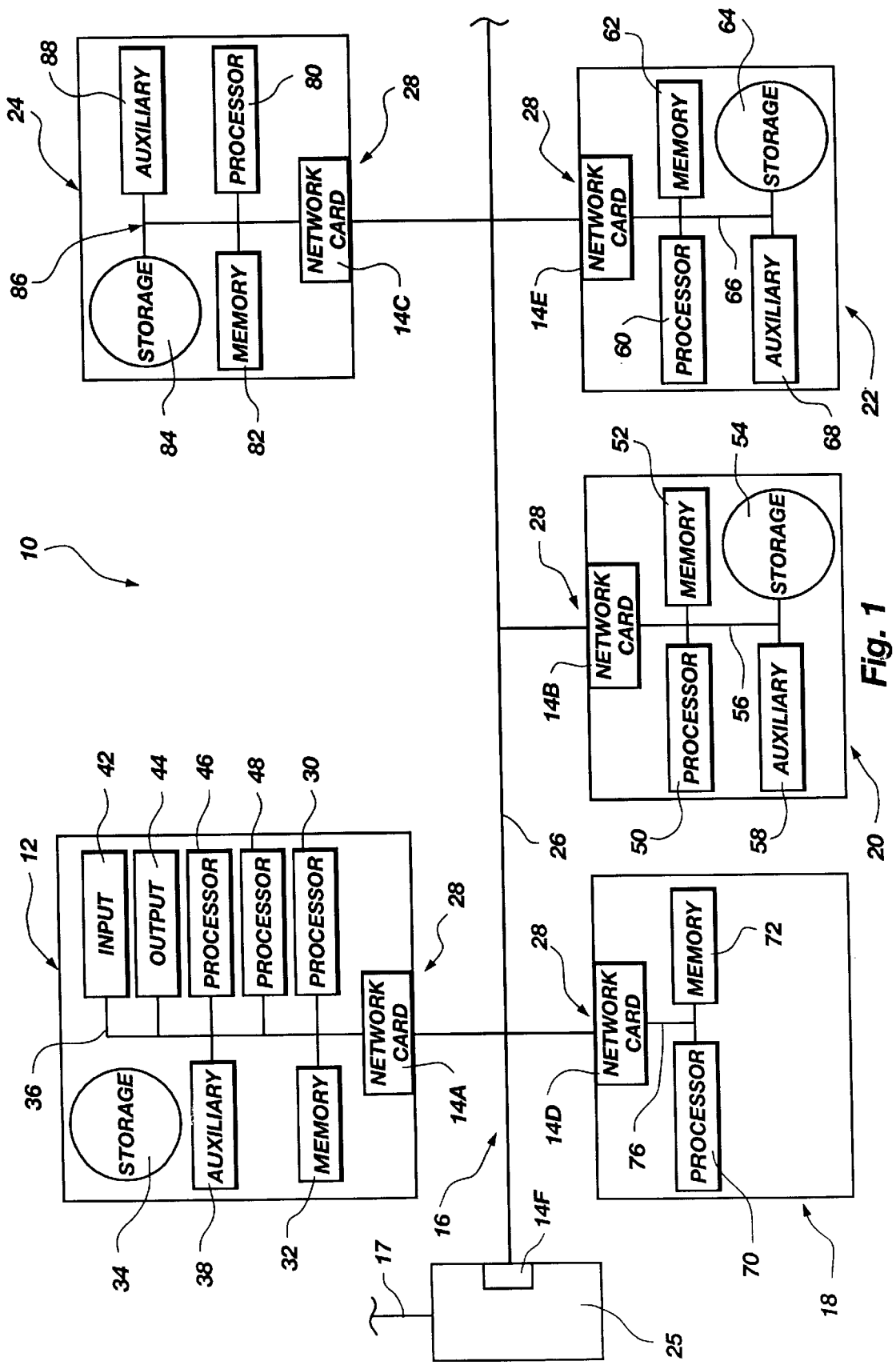
FIG. 1 is a schematic block diagram of one embodiment of an apparatus made in accordance with the invention.

The presently preferred embodiments of the invention will be best understood by reference to the drawings, wherein like parts are designated by like numerals throughout. Reference is first made to FIG. 1, which illustrates one preferred embodiment of a schematic diagram of hardware components, while FIG. 2 illustrates a block diagram of software modules operable on the apparatus from the block diagram of FIG. 1.

Figure 2:
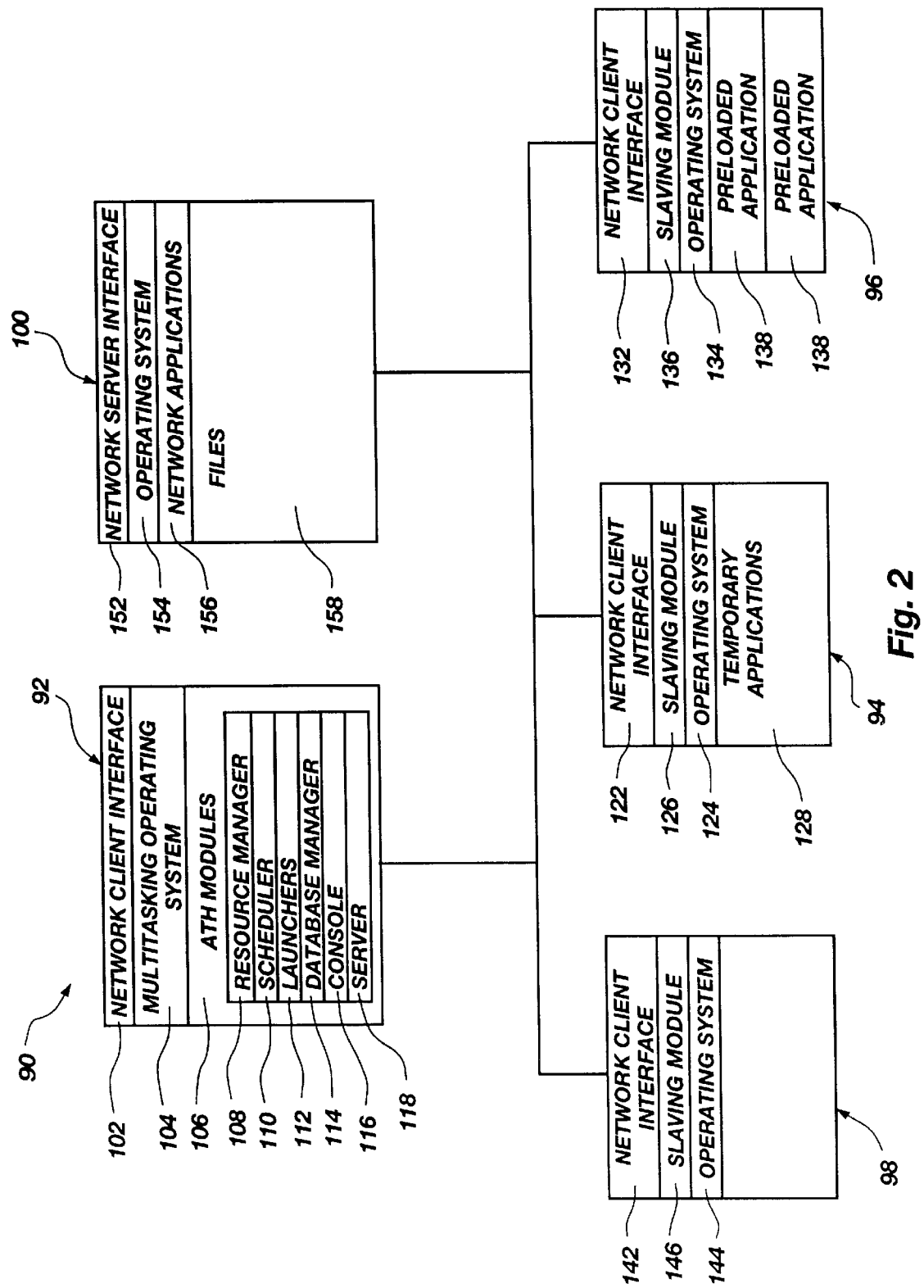
FIG. 2 is a schematic block diagram of one embodiment of software modules hosted on the apparatus of FIG. 1.
Figure 3:
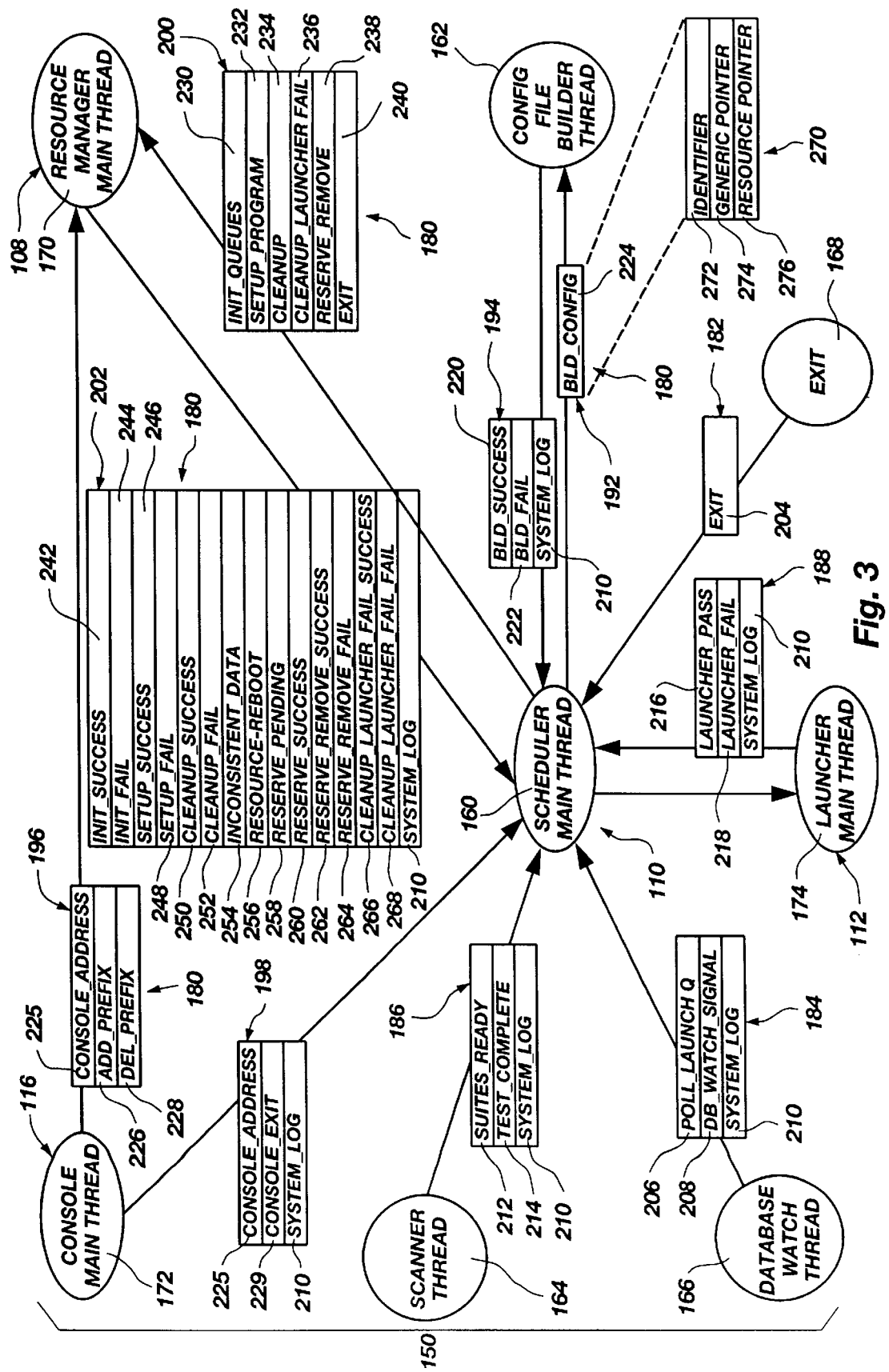
FIG. 3 is a schematic block diagram of one embodiment of processes and threads run on a controller, and operational codes passed between processes and threads running on the apparatus of FIG. 1.

FIG. 3 illustrates the processes and threads of certain software modules of FIG. 2, and particularly illustrates certain opcodes passed between the threads for establishing the operating logic of the apparatus of FIG. 1. Since the apparatus and processes may be queue driven according to messages or opcodes sent and received as appropriate, logic may be complex, but a multitude of logical paths may be determined by reference to the FIGS. 1–6.

Each operational code or opcode may be used by a sending and receiving thread or process according to the logic of the flow chart of FIG. 3. Data for inputs to and outputs from the components of apparatus of FIG. 1 may be stored in any suitable data structure or memory device. For example, in one embodiment, data may be stored in databases configured as illustrated by the representative records and fields of the databases of FIGS. 5–6.

Those of ordinary skill in the art will, of course, appreciate that various modifications to the detailed schematic diagrams of FIGS. 1–6 may easily be made without departing from the essential characteristics of the invention, as described in connection with the block diagram of FIGS. 1–6. Thus, the following description of the details of the schematic diagrams of FIGS. 3–6 is intended only as an example, and it simply illustrates one presently preferred embodiment of a schematic diagram that is consistent with the foregoing description of FIGS. 1–2 and the invention as claimed herein. The operation of various components and modules corresponding to each of the functional blocks of FIGS. 1–2 are outlined in FIGS. 3–6 and are numbered with like numerals.

Referring to FIG. 1, an apparatus 10, alternately referred to as a system 10 or an automated test harness 10 may include a controller 12. The controller 12 may be connected to a network interface 14A, or the network interface 14A may be integral to the controller 12. Regardless, the controller 12 may be connected to a network 16. The controller 12 may host a slaving software module for slaving a number of resources 18, alternately referred to as targets 18, or target computers 18. The resources 18 may have alternate embodiments including the resource 20 and resource 22. That is, a resource 18 may include all of the components of a general purpose computer. Nevertheless, the resource 18 need only contain a processor and sufficient memory to host an operating system for temporary enslavement to the controller 12, followed by later emancipation for running independently.

The resources 18, 20, 22, and controller 12 may be connected to a server 24 by means of a carrier 26, typically a physical line 26 or cable 26, although the carrier 26 may be a wireless carrier 26.

The controller 12 and resources 18, together with the server 24 may be configured in a variety of topologies. For example, the network 16 may be arranged as a star, a ring, a mesh having more than one connection on a single node, or the like. Alternatively, the network 16 may be configured as a bus having a single line 26 to which all nodes 28 connect. In general, a node 28 may be used to designate any microprocessor based device connectable to the network 16.

Similarly, the nodes 28 may be configured to operate under any one of a multitude of available protocols. For example, popular protocols that might be employed may include an internetwork packet exchange (IPX) or transmission control protocol/internet protocol (TCP/IP), sometimes called transport control protocol/interface program, sequenced packet exchange (SPX), token ring, and other protocols that are currently available or may be made available in the future.

The cable 26 of the network 16 may be of any suitable local area network (LAN) or wide area network (WAN). For example, a token ring cable system, a twisted pair, a co-axial cable, a 10 base T, fiber optic lines, microwave or other radio frequency (RF), wireless transmission media, infrared or laser communication beams, and the like. The controller 12 may operate under any suitable operating system, but in one preferred embodiment should include a true multi-tasking operating system.

Although the controller 12 may include multiple processors, a multi-tasking operating system operating on a single processor 30 may be selected from OS/2™, UNIX, Windows NT™, Windows 95™, Macintosh™ Operating System, Next Step™, or the like. An object-oriented operating system may be suitable, but is not required. The conventional Windows™ operating system is not truly multi-tasking, and as currently configured would not be suitable.

By contrast, the resources 18, 20, 22 need not have multi-tasking operating systems. Although any resource 18, 20, 22 may include an entire general purpose computer, and may host any operating system such as Windows 95, Next Step, Macintosh Operating System, OS-2, or the like. In short, the resources 18, 20, 22 may be configured with any operating system capable of operating on a processor.

For example, the Novell™ embedded systems technology (NEST) devices and systems represent a very limited capability. However, NEST devices are capable of hosting an operating system, and thereby operating under the direction of the controller 12 in the automated test harness 10 long enough to be configured for subsequent independent operatio That is, each resource 18 may include in a minimal configuration a central processing unit and sufficient memory, either on the individual chip associated with the processor, or independent thereof, capable of independent operation once loaded. Thus, each resource 18 need only be capable of executing instructions. In general an "executable" may be thought of as any data that may be understood by an operating system and thus resulting eventually in a machine code instruction executable by a processor.

As used here, a resource 18 may refer to any of the resources 18, 20, 22 or the like. Thus, a resource 18 may be the generalized expression for a resource 18, 20, 22 or the like.

Referring to FIG. 1, a controller 12 may include a processor 30 connected to a memory device 32 and a storage device 34. Connections may be made by a bus 36. Other auxiliary devices 38 may also connect to the bus 36. In addition, the controller 12 may include an input device 42, such as a keyboard, mouse, graphical user interface with some interactive sensor for receiving user inputs, or the like. Similarly, an output device 44 may be connected to the bus 36, such as a monitor for supporting a graphical user interface, or the like.

The controller 12 may have multiple processors 46, 48 in addition to the processor 30. Nevertheless, the processor 30 may simply be configured to host a multi-tasking operating system and thereby carry on all processing of the controller 12.

The resource 20 may be the most common embodiment of the resource 18 connected to the network 16. The resource 20 may include a processor 50 connected to a memory device 52 and storage device 54 for operational storage of data, and long-term non-volatile storage, respectively. The bus 56 connecting the processor 50 to the memory device 52 and the storage device 54 may also accommodate connections to other auxiliary device 58 whether singular or plural. Similarly, the resource 22 may be configured with different software packages to operate differently than the resource 20, as discussed below, but may also include a processor 60 connected to a memory device 62 and a storage device 64 by the bus 66. Auxiliary devices 68 may also be connected to the bus 66 as needed. The resource 18, needing only a processor 70 and a sufficient memory device 74 to provide for operations of the processor 70 may or may not include a bus 76, depending upon the configuration of the memory device 74 with respect to the processor 70. The resource 18 need only host an operating system, and need not be complex, or sophisticated. That is, certain devices exist that may be desirable to temporarily control by means of a controller 12 remotely connected over an extensive network 16. Any microprocessor-based device may be a suitable resource 18. For example, numerous types of data acquisition, instrumentation, process control, and other devices exist on networks 16. Temporary slaving, followed by emancipation for independent operation, may be desirable and suitable in an automated test harness 10 in accordance with the invention.

All nodes 28 connected to the network 16 may include network cards 14A, 14B, 14C, 14D, 14E, 14F as illustrated, for providing a hardware interface with the network 16. Different networks 16 provide for different amounts of embedded hardware and software for accomplishing the functions of a network card 14A, 14B, 14C, 14D, 14E, 14F. However, in general, a network card 14 designates any one of the network cards 14A–14F.

The server 24 may be a general purpose computer and may include a processor 80 connected to a memory device 82 and storage device 84 by a bus 86. Auxiliary devices 88 may include additional storage devices 84, additional memory devices 82, and the like as needed. Inasmuch as a server 24 provides file access and management for all the nodes 28 on the network 16, the server 24 may include various auxiliary devices 88.

The software system hosted by the nodes 28 of the automated test harness 10 may include a system of controller modules 92 and resource modules 94, 96, 98 as illustrated in FIG. 2. Also, server modules 100 may be hosted by the server 24. The controller modules 92 may include a network client interface 102 for driving the network card 14A. Thus, the network client interface 102 facilitates communication by the controller 12 over the network 16. The controller modules 92 also include a multi-tasking operating system for controlling the processor 30 of the controller 12.

An automated test harness 10 may include modules 106 (ATH Modules) or processes 106 hosted on the controller 12. Processes 106 may include a resource manager 108 for monitoring all of the resources 18 connected to the network 16. A scheduler 110 may be included for scheduling tests according to the availability of resources 18 and the requirements for each specific test. Launchers 112 may be "spawned" by the scheduler 110. A launcher 112 may be instructed by the scheduler 110 to run, and may be spawned as needed. Multiple instances of the launcher 112 may run simultaneously.

The data base manager 114 may be unique to the controller 12. Alternatively, a variety of suitable data base management software modules are available. For example, Lotus Notes™ has been shown to provide an "engine" for an effective data base manager. A console 116 may include software for interfacing with a user. For example, the console 116 may include a graphical user interface including icons, windows, and other mechanisms for selection by a user with a minimum of command structures.

The ATH modules 106 may include a server 118. Although a set of server modules 100 are hosted by the server 24, the controller 12, in one currently preferred embodiment of an apparatus 10 in accordance with the invention, may include a server module 118. Thus, the controller 12 may include all of the modules required to operate the automated test harness 10 and the server 24.

Thus, in general, all of the server modules 100 may actually be incorporated into the server module 118 in the controller 12. Nevertheless, the server 24 will be discussed as a separate hardware component of the automated test harness 10, hosting the server modules 100. The resource modules 94 may include a network client interface 122 for communicating with the network 16, as well as an operating system 124. A slaving module 126 may be included to permit enslaving of the operating system 124 to the controller 12 temporarily for configuring the resource 20 prior to emancipating the resource 20 to operate independently. In addition, temporary applications 128 may be hosted in the resource 20, typically by the resource 20 downloading the temporary applications 128 from the server 24 in response to commands received in a slave mode from the controller 12.

The resource modules 96 corresponding to the resource 22, may include a network client interface 132, an operating system 134, a slaving module 136, and preloaded applications 138. Although the resource modules 96 may be identical to those of the resource modules 94, for the sake of explanation and discussion, the resource 22 is configured to have preloaded applications 138, rather than temporary applications 128 as hosted by the resource 20. Thus, although not taking full advantage of the capabilities of the automated test harness 10, a resource 22 that is completely configured, including being loaded with the software to be run, may be fed information and commands one line at a time by the controller 12. Nevertheless, a more useful automated test harness 10 may be configured using resources such as the resource 20, in which temporary applications 128 are loaded by the resource 20 as a result of the controller 12 slaving the operating system 124 temporarily to instruct the resource 20 by command line instructions. That is, once the operating system 124 has been slaved to the controller 12, the operating system 124 may be instructed on what to load and how to load it. Thereafter, the operating system 124 and the resource 20 may be emancipated to operate independently, as though they had been programmed by a user individually. Nevertheless, the resource 20 at that point (emancipated) can operate to run software, download and upload files, with a very high degree of autonomy. This is substantially different than other slaving in which individual command lines must be passed to a preloaded executables in response to queries, or prompts.

The resource modules 98 represent a minimum configuration in which a processor 70 of a resource 18 need include only sufficient processor and memory capability to host an operating system 144. The resource module 98 may include a network client interface 142 and a slaving module 146 for facilitating communication between the controller 12 and the processor 70, or more correctly the operating system 144 hosted on the processor 70.

The network server modules 100 may include a network server interface 152 corresponding to the network client interfaces 102, 122, 132, 142. The network server interface 152 facilitates communication by the server 24 over the network 16. Thus, the controller modules 92 hosted by the controller 12 correspond to the resource module 94, 96, 98 and server modules 100 of the resources 20, 22, 18 and server 24, respectively.

The server modules 100 may include a network server interface 152 for facilitating communication by the operating system 154 over the network 16, while network applications 156 may operate "on top of" the operating system 154 for accomplishing the functional requirements of the server 24. Of course, a number of files 158 are typically stored on the storage device 84 of the server 24. Accordingly, the network applications 156 may perform management, storage, retrieval, indexing, and other associated functions for the files 158, serving the files 158 to each resource 18, 20, 22 or to the controller 12, as needed.

In general, the operating system 104 of the controller 12, or of the controller modules 92 hosted by the controller 12, should be a multi-tasking operating system such as an OS-2 or UNIX operating system, as discussed above. In addition, a network interface should render the controller 12 a node 28 on the network 16 served by the server 24. For example, the controller 12 may be set up as an OS-2 requester, or as a client in a network 16. The data base manager 114 of the controller modules 92 may require that the controller 12 host either the server software or the client software for the data base manager program. For example, the notes server or client may be associated with the Lotus Notes™ data base manager for managing all data base files associated with the automated test harness 10.

Each of the network interfaces 102, 122, 132, 142 may be configured to facilitate communication by the controller 12 at an operating system level with the resources 18, 20, 22. Thus, the controller 12, communicating as a node 28 of the network 16 may instruct the resources 18, 20, 22 to load executables. Nevertheless, as mentioned previously, the resource 22 may be preloaded with applications. This configuration gives less flexibility but may be used by the automated test harness 10. Nevertheless, even in such a configuration, the resource 22 may be enslaved by the controller 12, communicating with the operating system 34 to reconfigure the resource 22.

An explanation of the relationships between the various opcodes 180 and the threads 150 from which and to which each may be directed is explained below. However, referring to FIG. 3, the sources and destinations of all opcodes 180 may be illustrated by schematic block diagram. Since the logic of the automated test harness 10 is so intertwined among the various threads 160, 170, 172, 174, and opcodes 180, all opcodes 180 and threads 150 need to be identified, and their relationships identified, before the operation and logic of each may be properly explained with reference to each of the other opcodes 180 and threads.

In addition, Tables 1–3 below illustrate logical relations between various opcodes 180. Entries in Tables 1–3 are arranged more-or-less according to which process 106 in the second column is sending an opcode 180 in the third column. In certain circumstances, a thread 150, in general, of the scheduler 110 may send an opcode 180 to another general thread 150 of the scheduler 110.

For each opcode 180 identified in the middle or third ("opcode") column, the process 106 in the second ("from")

column is the sending process 106, and the process 106 in the fourth ("to") column receives the opcode 180. The sending process 106 identified in the second column may send an opcode 180 upon receiving an opcode 180, or occurrence of some other initiating event, identified in the first ("initiated by") column.

The receiving process 106 of the fourth ("to") column may send a return opcode 180 identified in the fifth ("returns") column. A returned opcode 180 is typically sent to the sending process 106 of the second ("from") column, but may be sent to another process 106, either of which will be identified in the sixth or last ("to") column.

One may note that no return opcodes are shown in Table 2, and thus no fifth and sixth columns. This is merely for presentation here. That is, only the opcode RESOURCE_REBOOT 256 sent to the scheduler 110 has an associated return. The CLEANUP 234 opcode is returned to the resource manager 108.

TABLE 1

OPCODES FROM SCHEDULER TO RESOURCE MANAGER

| INITIATED BY | FROM | OPCODE | TO | RETURNS | TO |
|---|---|---|---|---|---|
|  | SCH 110 | INIT_QUEUES 230 | RM 108 | INIT_SUCCESS 242 | SCH 110 |
|  | SCH 110 | INIT_QUEUES 230 | RM 108 | INIT_FAIL 244 | SCH 110 |
| BLD_SUCCESS 220 | SCH 110 | SETUP_PROGRAM 232 | RM 108 | SETUP_FAIL 248 | SCH 110 |
| BLD_SUCCESS 220 | SCH 110 | SETUP_PROGRAM 232 | RM 108 | SETUP_SUCCESS 246 | SCH 110 |
| BLD_SUCCESS 220 | SCH 110 | SETUP_PROGRAM 232 | RM 108 | RESERVE_PENDING 258 | SCH 110 |
| BLD_SUCCESS 220 | SCH 110 | SETUP_PROGRAM 232 | RM 108 | RESERVE_SUCCESS 260 | SCH 110 |
| TEST_COMPLETE 214 | SCH 110 | CLEANUP 234 | RM 108 | CLEANUP_SUCCESS 250 | SCH 110 |
| TEST_COMPLETE 214 | SCH 110 | CLEANUP 234 | RM 108 | CLEANUP_FAIL 248 | SCH 110 |
| RESOURCE_REBOOT 256 | SCH 110 | CLEANUP 234 | RM 108 | CLEANUP_SUCCESS 250 | SCH 110 |
| RESOURCE_REBOOT 256 | SCH 110 | CLEANUP 234 | RM 108 | CLEANUP_FAIL 248 | SCH 110 |
| LAUNCHER_FAIL 218 | SCH 110 | CLEANUP_LAUNCHER_FAIL 236 | RM 108 | CLEANUP_LAUNCHER_FAIL_FAIL 268 | SCH 110 |
| LAUNCHER_FAIL 218 | SCH 110 | CLEANUP_LAUNCHER_FAIL 236 | RM 108 | CLEANUP_LAUNCHER_FAIL_SUCCESS 266 | SCH 110 |
| (LAUNCH ENTRY DELETED) | SCH 110 | RESERVE_REMOVE 238 | RM 108 | RESERVE_REMOVE_SUCCESS 262 | SCH 110 |
| (LAUNCH ENTRY DELETED) | SCH 110 | RESERVE_REMOVE 238 | RM 108 | RESERVE_REMOVE_FAIL 264 | SCH 110 |
| CONSOLE_EXIT 229 | SCH 110 | EXIT 204 | RM 108 |  |  |

TABLE 2

OPCODES FROM RESOURCE MANAGER TO SCHEDULER

| INITIATED BY | FROM | OPCODE | TO |
|---|---|---|---|
| INIT_QUEUES 230 | RM 108 | INIT_SUCCESS 242 | SCH 110 |
| INIT_QUEUES 230 | RM 108 | INIT_FAIL 244 | SCH 110 |
| SETUP_PROGRAM 232 | RM 108 | SETUP_SUCCESS 246 | SCH 110 |
| SETUP_PROGRAM 232 | RM 108 | SETUP_FAIL 248 | SCH 110 |
| CLEANUP 234 | RM 108 | CLEANUP_SUCCESS 250 | SCH 110 |
| CLEANUP 234 | RM 108 | CLEANUP_FAIL 252 | SCH 110 |
| (UNIDENTIFIED OPCODE) | RM 108 | INCONSISTENT_DATA 254 | SCH 110 |
| (RESOURCE REBOOTED) | RM 108 | RESOURCE_REBOOT 256 | SCH 110 |
| SETUP_PROGRAM 232 | RM 108 | RESERVE_PENDING 158 | SCH 110 |

TABLE 2-continued

OPCODES FROM RESOURCE MANAGER TO SCHEDULER

| INITIATED BY | FROM | OPCODE | TO |
|---|---|---|---|
| (R_P 158 SENT PREVIOUSLY) | RM 108 | RESERVE_SUCCESS 160 | SCH 110 |
| RESERVE_REMOVE 238 | RM 108 | RESERVE_REMOVE_SUCCESS 262 | SCH 110 |
| RESERVE_REMOVE 238 | RM 108 | RESERVE_REMOVE_FAIL 264 | SCH 110 |
| CLEANUP_LAUNCHER_FAIL 236 | RM 108 | CLEANUP_LAUNCHER_FAIL_SUCCESS 266 | SCH 110 |
| CLEANUP_LAUNCHER_FAIL 236 | RM 108 | CLEANUP_LAUNCHER_FAIL_FAIL 268 | SCH 110 |

Referring to FIG. 3, the controller 12 may operate several processes 108, 110, 112, 116, 118. In addition, each process 108, 110, 112, 116, 118 may include multiple threads. For example, the scheduler 110 may include a main thread 160 communicating with a configuration file builder thread 162, a scanner thread 164, a data base watch thread 166, and an exit thread 168. In one embodiment, the data base watch thread 166 may be incorporated, included in, the main thread 160. Similarly, the exit thread 168 may be included in the main thread 160. In general, the individual threads 162, 164, 166, 168 may be included within a main thread 160 or separated out to operate on the multi-tasking operating system 104.

The scheduler 110 may be made to operate on the controller 12, providing feedback and prompts to a user in a window of a graphical user interface of the console main thread 172, providing visible output to a user on an output device 44 of the controller 12. The output device 44 may be, for example, a monitor associated with the controller 12.

The main thread 170 of the resource manager 108 may provide management of all the resources 18 connected to the network 16. That is, the resource manager 108 tracks all resources 18, their status, their capabilities, their physical and software limitations, and provides information regarding these resources 18 and their availability to the scheduler 110, and more particularly to the main thread 160.

The console 116, although it may have multiple threads, in one embodiment presently preferred, may include a main thread 172 for implementing a graphical user interface for a user operating the controller 12. The console main thread 172 communicates to the scheduler main thread 160 and the resource manager main thread 170. By contrast, the scheduler main thread 160 and resource manager main thread 170 may communicate back and forth with one another. However, in one embodiment, the console main thread 172 may simply send out information and not receive information from the main threads 160, 170. Alternatively, other tasks and functions may be provided for or executed by the console 116.

TABLE 3

OTHER OPCODES

| INITIATED BY | FROM | OPCODE | TO | RETURNS | TO |
|---|---|---|---|---|---|
| RESERVE_SUCCESS 260 | SCH 110 | SUITES_READY 121 | SCH 110 | SETUP_PROGRAM 232 | RM 108 |
| | SCH 110 | TEST_COMPLETE 214 | SCH 110 | CLEANUP 234 | RM 108 |
| SETUP_SUCCESS 246 | SCH 110 | BLD_CONFIG 224 | SCH 110 | BLD_SUCCESS 220 | SCH 110 |
| SETUP_SUCCESS 246 | SCH 110 | BLD_CONFIG 224 | SCH 110 | BLD_FAIL 222 | SCH 110 |
| BLD_CONFIG 224 | SCH 110 | BLD_SUCCESS 220 | SCH 110 | (LAUNCHER 112 INITIATED) | |
| BLD_CONFIG 224 | SCH 110 | BLD_FAIL 222 | SCH 110 | | |
| | ANY | SYSTEM_LOG 210 | SCH 110 | | |
| | LAU 112 | LAUNCHER_PASS 216 | SCH 110 | | |
| | LAU 112 | LAUNCHER_FAIL 218 | SCH 110 | | |
| | CON 116 | CONSOLE_ADDRESS 225 | SCH 110 | | |
| | CON 116 | CONSOLE_ADDRESS 225 | RM 108 | | |
| (USER ON CONSOLE GUI) | CON 116 | ADD_PREFIX 226 | RM 108 | | |
| (USER ON CONSOLE GUI) | CON 116 | DEL_PREFIX 228 | RM 108 | | |
| (USER ON CONSOLE GUI) | CON 116 | CONSOLE_EXIT 229 | SCH 110 | | |

The launcher 112 may include a launcher main thread 174, and may be configured to have other threads. However, the launcher 112 may be "spawned" in multiple versions by the scheduler main thread 160. That is, the launcher 112 may be simultaneously running in more than one instantiation, to accommodate the multiple resources 18 that must be configured and run.

Each of the threads 160, 162, 164, 166, 168, 170, 172, 174 may communicate with one another by a series of opcodes 180. For example, the opcodes 180 may be referred to as opcodes 180, and may be illustrated by the opcodes 182 communicating between the exit thread 168 and the main thread 160. Similarly, the opcodes 184 may communicate between the data base watch thread 166 and the main thread 160. The opcodes 186 may be passed from the scanner thread 164 to the main thread 160, while the opcodes 188 are passed from the launcher main thread 174 to the scheduler main thread 160. Similarly, the opcodes 192 pass from the scheduler 110 to the scheduler main thread 160 to the configuration file builder thread 162, the opcodes 194 pass from the configuration file builder thread 162 back to the scheduler main thread 160, the opcodes 196 pass from the console main thread 172 to the resource manager main thread 170, and the opcodes 198 pass from the console main thread 172 to the scheduler main thread 160. The opcodes 200 may pass from the scheduler main thread 160 to the resource manager main thread 170 while the opcodes 202 pass from the resource manager main thread 170 to the scheduler main thread 160.

In general, each opcode 180 may have a generic opcode structure 270. In one presently preferred embodiment of an apparatus 10 in accordance with the invention, an opcode structure 270 may include three pieces of information, each comprising three long (32 bit) words. The first piece of information is an identifier 272 that may be a name, or a number that uniquely identifies a particular opcode 180. A generic pointer 274 may follow the identifier 272 and may include an address for identifying generic data that may be used by the process receiving the opcode 180. Following the generic pointer 274, a resource pointer 276 may contain a memory address associated with data stored in the memory device 32 of this controller 12, or similar devices specifically for use in identifying and managing resources 18. The purpose of a generic pointer 274 and resource pointer 276 rather than a single pointer, is to simplify logic and speed up operation.

As referenced earlier, the data base watch thread 166 and the exit thread 168 may be incorporated directly into the scheduler main thread 160. Similarly, the scanner thread 164 in one embodiment of an apparatus 10 in accordance with the invention, may be incorporated into the scheduler main thread 160. However, in general, opcodes may each be made to operate similarly, or even identically. At a source thread, an opcode indicates to the source thread to reserve a memory block, that is, a specific segment of memory in a memory device such as the memory device 32. The source thread then writes the identifier 272, a generic pointer 274, and a resource pointer 276 into the reserved block of memory. The source thread then sends the address of the opcode 180 to a destination thread by writing the address to a message queue associated with the destination thread. A destination thread periodically reads all messages in a message queue associated with a destination thread. Upon reading the message received from the source thread, the destination thread receives the address of the opcode 180. The destination thread then reads the opcode in the memory block, ascertaining the identifier 272, and the pointers 274, 276. The destination thread then may move an execution pointer in the opcode associated with the thread that has received the opcode 180, and may begin executing the opcode at the designated location. Thus, the opcode identifier 272 has served to move an execution pointer within the coded executable of the destination thread. The destination thread then executes the opcode using the data pointed to by the pointers 274, 276. In certain circumstances, the destination thread may return an opcode 180 to the source thread, or to another thread in the controller 12, and particularly the controller modules 92.

In one embodiment, opcodes 182 may include an EXIT 204. The data base watch thread 166 may send opcodes 184 to the scheduler main thread 160, including a POLL_LAUNCHQ 206, a DB_WATCH_SIGNAL 208, and a SYSTEM_LOG 210. The scanner thread 164 may send opcodes 186 including a SUITES_READY 212, a TEST_COMPLETE 214, and a SYSTEM_LOG 210 to the main thread 160. The launcher main thread 174 of any individual launcher 112 "spawned" by the scheduler 110, may return to the scheduler main thread 160 any of the opcodes 188 including a LAUNCHER_PASS 216, LAUNCHER_FAIL 218, SYSTEM_LOG 210, and others as appropriate.

The configuration file builder thread 162 may send the opcodes 194 to the main thread 160, which opcodes 194 may include a BLD_SUCCESS 220, a BLD_FAIL 222, or SYSTEM_LOG 210. The opcodes 194 may be sent by the configuration file builder thread 162 in response to one of the opcodes 192, which may include a BLD_CONFIG 224 opcode. The console main thread 172 may send a CONSOLE_ADDRESS 225 to the resource manager main thread 170. In addition, an ADD_PREFIX 226 or DEL_PREFIX 228 may be sent from the console main thread 172 to the resource manager main thread 170.

The console main thread 172 may receive no opcodes 180 from other threads. Rather, the console main thread 172 may receive its principal direction from inputs from a graphical user interface gathering inputs from a user. The console main thread 172 does send a CONSOLE_EXIT 229 opcode to the scheduler main thread 160, indicating that a system exit is in order. The CONSOLE_ADDRESS 225 may also be sent from the console main thread 172 to the scheduler main thread 160. The SYSTEM_LOG 210 may be sent by any thread to the scheduler main thread 160.

The scheduler main thread 160 may send an INIT_QUEUES 230 opcode to the resource manager main thread 170. Similarly, a SETUP_PROGRAM 232 may be forwarded to the resource manager main thread 170, which like all main threads may be referred to as the main thread 170.

A CLEANUP 234 or CLEANUP_LAUNCHER_FAIL 236 may be sent from the scheduler main thread 160 to the resource manager main thread 170. A RESERVE_REMOVE 238 or an EXIT 240 may be passed from the scheduler main thread 160 to the resource manager main thread 170.

In the return direction from the resource manager main thread 170 back to the scheduler main thread 160, a host of opcodes 202 may be sent, including INIT_SUCCESS 242, INIT_FAIL 244, SETUP_SUCCESS 246, SETUP_FAIL 248, CLEANUP_SUCCESS 250, and CLEANUP_FAIL 252. Each of the opcodes 202 provides information from the resource manager 108 to the scheduler 110 to indicate the status of a given resource 18 selected for a particular test.

In addition, the resource manager main thread 170 may send INCONSISTENT_DATA 254, RESOURCE_REBOOT 256, RESERVE_PENDING 258, RESERVE_

SUCCESS 260, RESERVE_REMOVE_SUCCESS 262, or RESERVE_REMOVE_FAIL 264 in response to various opcodes 200 received by the resource manager main thread 170.

The resource manager main thread 170 may send a CLEAN_UP_LAUNCHER_FAIL_SUCCESS 266 or a CLEANUP_LAUNCHER_FAIL_FAIL 268 to the scheduler main thread 160. As with other threads in communication with the scheduler 160, the resource manager main thread 170 may send a SYSTEM_LOG 210 to the scheduler main thread 160.

Figure 4:
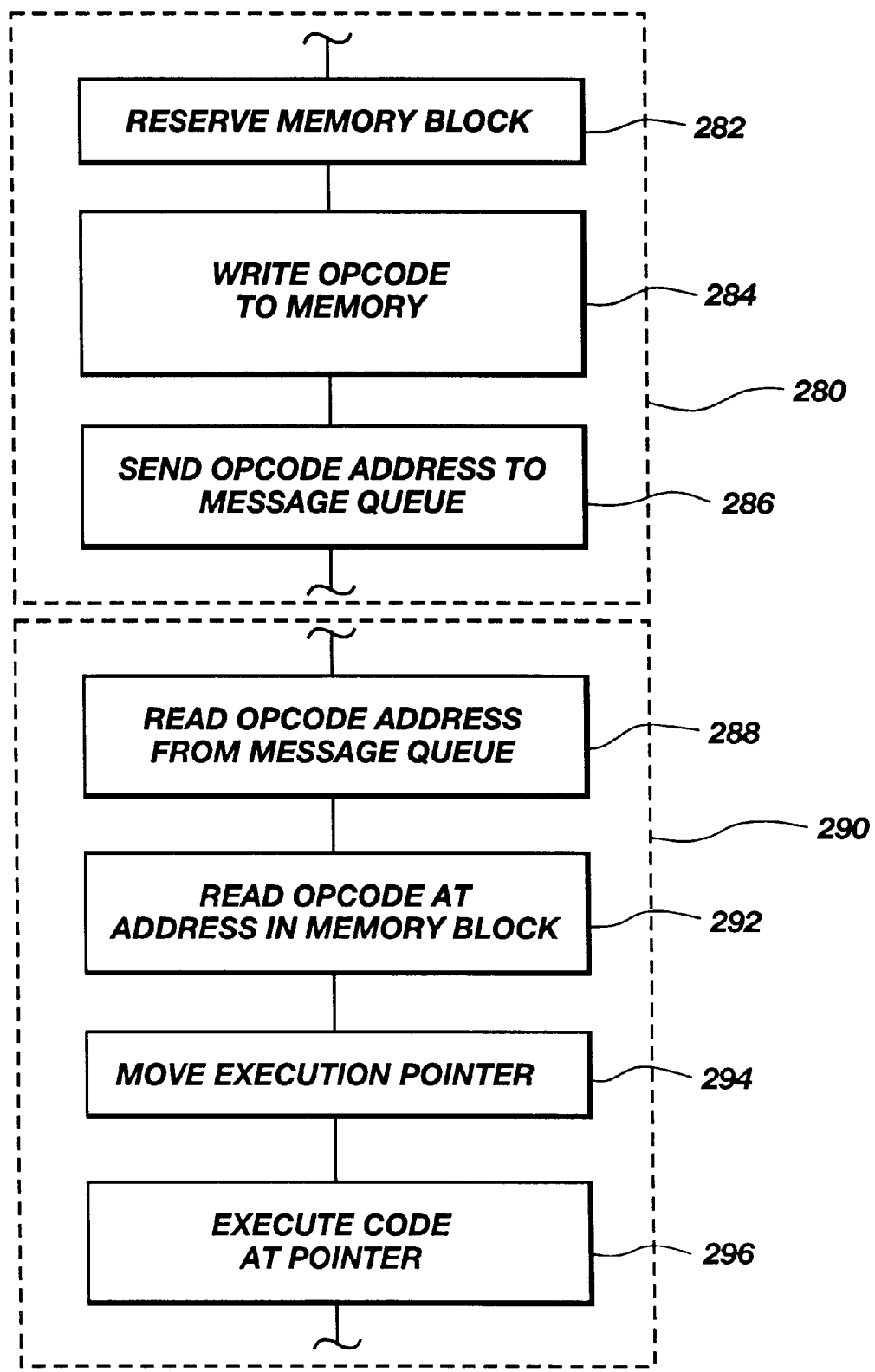
FIG. 4 is a schematic block diagram of one embodiment of a process by which the operational codes of FIG. 3 may operate.

Referring now to FIG. 4, before returning to the definitions and further relationships illustrated in FIG. 3, the operation of a source thread 280 and a destination thread 290 are shown with respect to each other and an opcode 180 contained in the opcode structure 270 of FIG. 3.

In general, any thread 150 may be regarded as a source thread 280 and any other thread 150 may be regarded as a destination thread 290. Each opcode 180 may be used by a source thread 280 as illustrated in FIG. 4. At an appropriate point in the execution of the source thread 280, the reserve memory 282 step may be executed. The effect of the reserve memory 282 may be to reserve a segment or block of memory, typically in the memory device 32 of the controller 12. The write opcode 284 step may then follow, in which the source thread 280 writes an opcode 180 including all of the elements of the opcode structure 270 to the memory block reserved by the reserve memory 282 step.

After writing the identifier 272, generic pointer 274, if applicable, and resource pointer 276, as required, the source thread 280 executes a SEND_ADDRESS 286 step. The SEND_ADDRESS 286 step may include sending the address in the memory device 32 or other memory device to which the opcode 180 may be stored, to a message queue readable by a destination thread 290. A destination thread 290 may include an operation read address 288, that may have the effect of reading the code address written by the source thread 280 in the SEND_ADDRESS operation 286. The destination thread 290 periodically may read the message queue. Thus, the READ_ADDRESS 288 operation will effectively read the code address from the message queue.

The destination thread 150 next may read the opcode 180 itself at the address in the memory block, as designated by the code address read in the READ_ADDRESS operation 288.

The effect of the READ opcode 292 may be to provide an identifier 272 from the opcode structure 270 of the opcode 180, which identifier 272 indicates a location for an execution pointer in the destination thread 290. The destination thread 290 then executes a move pointer operation 294 in which the execution pointer of the processor 30 may be moved to the appropriate location designated by the identifier 272. The destination thread 290 then executes 296. The executing 296 operation effectively executes the code beginning at the execution pointer designated in the MOVE_POINTER 294 operation. The code of the destination thread 290 may have a return, or may itself write a new opcode 180 and return it to the source thread 280 or to some other thread 150. In sending a return opcode 180, the destination thread 290 may use the same operations or steps 282, 284, 286 since in such an operation, the destination thread 290 becomes the new source thread 280 for the returned opcode 180.

Referring again to FIG. 3, the operational codes 180 or opcodes 180, remembering that auxiliary thread 150 such as the threads 164, 166, 168 may optionally be incorporated into the main thread 160 of the scheduler 110. It may be instructive to discuss the opcodes 180 associated with the scheduler 110. The EXIT opcode 204 initiates a scheduler 160 to signal the resource manager 108 with an EXIT opcode 240 to exit the system 10. Alternatively, the EXIT opcode 204 may be sent from within the scheduler main thread 160, or may be replaced by the CONSOLE_EXIT opcode 229.

The POLL_LAUNCHQ 206 may be used to instruct the main thread 160 to periodically, or upon occurrence of a signalling event, poll the launch queue data base 302 for a new record 303, indicating an addition to the launch queue.

The DB_WATCH_SIGNAL 208 opcode may be used to indicate to the main thread 160 that certain of the data bases 300 have had records 301 recently written to them. Since the apparatus 10 in one currently preferred embodiment may be queue-driven, one methodology for prompting a thread 150 to execute an instruction, may be to provide reading of data bases 300, or reading of fields in data bases written with the specific purpose of operating as flags to indicate occurrence of an awaited event or triggering event.

The SYSTEM_LOG 210 may be sent by the data base watch thread 166 to the main thread 160 to produce a message that may eventually be saved in a system log data base 310. Since the scheduler 110 manages most of the interaction between the processor 30 of the controller 12 and the data bases 300, the main thread 160 may be tasked with the operation of reporting or writing all entries into the system log data base 310. The system log data base 310 may be normally used to store reports of system errors. Thus, the SYSTEM_LOG 210 opcode may be normally sent to the scheduler main thread 160 to report system errors. No initiation opcode 180 may be required to send the SYSTEM_LOG 210, and no return opcode 180 need be returned in reply or as a direct result.

The SUITES_READY 212 opcode may be sent to the scheduler main thread 160 when a test is ready for running on a resource 18. The SUITES_READY 212 may also be sent as a result of a RESERVE_SUCCESS 260 opcode received. Thus, the main thread 160 may typically receive the SUITES_READY 212 opcode, and may actually initiate it within the main thread 160 in response to a RESERVE_SUCCESS 260 initiation opcode 180 received from the resource manager 108. The scheduler main thread 160 may send a SETUP_PROGRAM 232 return opcode to the resource manager main thread 170.

The TEST_COMPLETE 214 opcode may be sent when the scheduler 110, and more particularly the scanner thread 164 has detected that a test has completed running. Thus, no initiation opcode 180 may be required, but the main thread 160 may then send, in response, or as a result, a CLEANUP 234 return opcode to the resource manager main thread 170.

The LAUNCHER_PASS 216 opcode may be returned by a launcher main thread 174 to the scheduler 110, and more particularly to the scheduler main thread 160 when a test has been successfully launched. A successful launch of a test 305 indicates that the launcher 112 was able to configure a resource 18, also referred to as a target 18 or target resource 18, at an operating system level, and the subject resource 18 has successfully loaded the test program and the necessary data. The test 305 is therefore running. No initiation opcode 180 may be required for the LAUNCHER_PASS 216, but the launcher 112 is itself "spawned" by the scheduler main thread 160, which may be itself an initiating event. No return opcode 180 may be necessary from the main thread 160.

The LAUNCHER_FAIL 218 may be sent by the launcher main thread 174 to the scheduler main thread 160 if a test 305 has not been successfully launched. Some reasons why a launch may fail may include the failure of a "login" command from a launcher 112 to a resource 18, failure of a "map" command to map the necessary drives, or perhaps more properly, for example, virtual drives on the storage devices 54, 64 or memory devices 52, 62, 72 of the resources 18. As discussed above, the resource 18 refers generally to all resources 18, 20, 22, and the like. The LAUNCHER_FAIL 218 requires no initiation opcode 180, since a launcher is "spawned" by the scheduler 110. No return opcode 180 may be required.

The BLD_SUCCESS 220 may be sent from the configuration file builder thread 162 to the scheduler main thread 160 when the scheduler 110, and more specifically, the configuration file builder thread 162 has successfully organized the information necessary to run a test 305. The initiation opcode BLD_CONFIG 224 may be first received by the configuration file builder thread 162 from the main thread 160. No return opcode 180 may be required.

The receipt of the BLD_SUCCESS 220 may be an initiating event for the scheduler main thread 160. The response by the scheduler main thread 160 may be to "spawn" a launcher 112, which will itself initiate a test 305, setting up the proper resources 18 to conduct the test 305.

The BLD_FAIL 222 opcode may be returned to the main thread 160 from the configuration file builder thread 162 when the information necessary to operate a test 305 has not been successfully organized by the configuration file builder thread 162. For example, if datafiles are not present, if required entries are not available, if a token value is not defined, if an operating system refuses to function properly, or if any flaw in logic or data, then the configuration file builder thread 162 may not be able to provide all of the configuration information needed by the launcher 112. The initiation opcode 180 may be a BLD_CONFIG 224 opcode, but no return opcode 180 may be necessary.

The BLD_CONFIG 224 may be sent to the configuration file builder thread 162 of the scheduler 110 by the main thread 160. The function of the opcode 224 may be to compile and organize all information associated with the opcode 224 so that a launcher 112 may be "spawned" by the main thread 160, and will have all of the data necessary to run a test 305. An initiation opcode 180 for the opcode 224 may be the SETUP_SUCCESS 246 received from the resource manager main thread 170. Thus, the resource manager main thread 170, having identified that the hardware resources 18 are available, properly equipped, and otherwise ready for employment in a test 305, sends the initiation opcode SETUP_SUCCESS 246 to the main thread 160 of the scheduler 110. Possible return opcodes sent from the scheduler 110 to the configuration file builder thread 162 may include the BLD_SUCCESS 220 or the BLD_FAIL 222 opcodes.

Thus, the opcodes 212, 214, 220, 222, 224 originate in a thread of the scheduler 110 and may be sent to the originating thread or another thread of the scheduler 110. The SYSTEM_LOG 210, in contrast, may be returned by any process 106 to the scheduler main thread 160.

The CONSOLE_ADDRESS 225 may be sent by the console main thread 172 to the resource manager main thread 170. This opcode 225 may be sent during an initialization for the automated test harness 10 for the purpose of sending an address of global memory, available to all processes 106 and threads 150, to the resource manager 108, and more particularly to the main thread 170. Similarly, the CONSOLE_ADDRESS 225 opcode may be sent from the console 116 to the scheduler 110, typically from the main thread 172 to the main thread 160. Since global memory may be used for all the data structures associated with any opcode, the block of global memory established by the CONSOLE_ADDRESS 225 may be available to all processes 106. No initiation opcode 180 may be necessary, since the opcode 225 may be sent during the start-up phase for the automated test harness 10. Similarly, no return opcode 180 may be necessary.

The main thread 172 may also send an ADD_PREFIX 226 or a DEL_PREFIX 228 to the resource manager main thread 170. The opcode ADD_PREFIX 226 may be a signal to the resource manager 108 that another resource prefix should be added to a list. That is, a prefix may be an initiation opcode 180 in the name of a service advertising protocol (SAP) in a slaving program protocol. For example, a slaving program such as NCONTROL™ is a Novell™ slaving program that has been found suitable for facilitating the temporary slaving operation for setup, configuring the resource 18 through its operating system by the controller 12. After the setup operation, the resource 18 may be "emancipated," left to operate independently, loading applications and files over the network as needed by applications running on the resource 18.

Thus, a prefix may be added to a SAP string by a resource manager 108 in response to the opcode 226. The resource manager 108 then uses the prefix to know which resources 18 are to be used for a given task. The resource manager 108 may handle multiple prefixes. An initiation opcode 180 is not necessarily required, although the opcode 226 may be initiated by another opcode 180. However, in one embodiment of an apparatus 10 made in accordance with the invention, a user may make a selection from a graphical user interface hosted by the console 116. A selection of the feature designated to add a prefix may be selected by a user. In response to the selection by a user, the console 116 sends the ADD_PREFIX 226 to the scheduler 110.

The DEL_PREFIX 228 effectively instructs the resource manager 108 to cease looking for resources 18 that are advertising with the SAP prefix associated with the opcode 228. As with the ADD_PREFIX 226, the opcode 228 has no return opcode 180. Similarly, no initiation opcode 180 may be required. However, as with the opcode 226, a selection by a user of an icon, such as a delete button, selection box, or the like presented on screen of a graphical user interface of the console 172 may be used to initiate the opcode 228.

The CONSOLE_EXIT 229 opcode may be sent to the scheduler 110 to signal a system exit. As with other opcodes 180 initiated by the console 116, the opcode 229 may be initiated by a user selection from the graphical user interface presented on a screen of a monitor associated with the console 116. Thus, no initiation opcode 180, that is opcode 180 associated with initiation, is required. Similarly, no return opcode 180 may be appropriate. The appropriate response by the scheduler 160 may be a system exit.

The INIT_QUEUES 230 may be sent by the scheduler 110 to synchronize with the resource manager 108, thus ensuring that all queues are properly set up, identified, and functioning for receiving messages for the appropriate threads 150. No initiation opcode 180 may be required, although possible return opcodes may include INIT_SUCCESS 242 or INIT_FAIL 244 opcodes returned by the resource manager 108.

The SETUP_PROGRAM 232 opcode sent by the scheduler 110 has the effect of requesting resources 18 needed for a test 305. The information associated with the opcode 232 identifies resource information structures identifying the nature of the needed resources 18. Thus, a "specification" of sorts may be associated with the opcode 232. An initiation opcode BLD_SUCCESS 220 gives rise to the opcode 232. Thus, when configuration by the thread 162 is complete, the scheduler main thread 160 makes a resource request of the resource manager 108 with the opcode 232. Possible return opcodes may include SETUP_SUCCESS 246, SETUP_FAIL 248, RESERVE_PENDING 258, or RESERVE_SUCCESS 260 sent by the resource manager 108 to the scheduler 160.

The CLEANUP 234 opcode may be used by the scheduler 110 to instruct the resource manager 108 to free resources 18, making those resources 18 available for use in a new test 305. This is usually done when a resource 18 has been allocated or reserved for a particular test 305 needing the capabilities of the selected resource 18. With each opcode 234, a list of information structures associated with the selected resource 18 is associated. Although information may be sent with an opcode 180, information may also be stored and pointed to by the pointers 274, 276 associated with the opcode 234. Initiation opcodes 180 giving rise to the CLEANUP 234 opcode may include TEST_COMPLETE 214, from the scanner thread 164, or RESOURCE_REBOOT 256 sent by the resource manager 108 in response to a reboot, typically occurring outside of the control of the automated test harness 10. Possible return opcodes 180 may include CLEANUP_SUCCESS 250, and CLEANUP_FAIL 252.

The CLEANUP_LAUNCHER_FAIL 236 bears some resemblance to the CLEANUP 234 opcode. However, the opcode 236 may be sent after the scheduler 110 receives a LAUNCHER_FAIL 218 opcode from the launcher 112. Thus, the effects are the same, although the initiation sources are different. The initiation opcode 180 for the opcode 236 may include the LAUNCHER_FAIL 218, while possible return opcodes may include CLEANUP_LAUNCHER_FAIL_SUCCESS 266, or CLEANUP_LAUNCHER_FAIL_FAIL 268.

The RESERVE_REMOVE 238 opcode may be sent by the scheduler 110 to the resource manager 108 when an entry is deleted from the launch queued data base 302. That is, to the extent that an entry in the launch queue data base 302 has certain resources 18 reserved for the test 305 specified, those resources 18 need to be released when a test 305 is canceled. Thus, the opcode 238 instructs the resource manager 108 to release the reserve resources 18 and delete the reservation entry from any internal tables maintained by the resource manager 108. The opcode 238 may have associated with it an instance identification of a deleted entry in the launch queue data base 302. The instance identification, sometimes referred to as instance ID, may be a unique number assigned by an automated test harness 10 to each test 305 that is to be run. Thus, with each instance of a launcher 112, or of a test 305 to be run by a launcher 112, an instance ID may be assigned. Thus, any test 305 may be tracked according to its unique instance ID. Possible initiation opcodes 180 for the opcode 238 may be used, but in one embodiment of an apparatus 10 in accordance with the invention, the deletion of an entry from the launch queue data base 302 may be detected by the scheduler main thread 160 monitoring the launch queue 302. Thus, the main thread 160 may then initiate the opcode 238 upon detection of deletion of an entry. Possible return opcodes 180 may include RESERVE_REMOVE_SUCCESS 262 and RESERVE_REMOVE_FAIL 264, returned by the resource manager 108 to the scheduler 110. Although return opcodes 180 are often returned to an initiating or source thread 280, such need not be the case. A return opcode 180, in general, may be simply an output opcode 180 associated with a thread 150 operating in accordance with another received opcode 180.

The EXIT 240 opcode may be sent to the resource manager 108 to signal a system exit. The initiation opcode 180 may be controlled by an exit thread 168 sending an EXIT 204 opcode to the scheduler main thread 160. However, in one presently preferred embodiment of an apparatus 10 made in accordance with the invention, all control over the EXIT 204 opcode may reside in the console 116. Thus, an appropriate initiation opcode 180 may be a CONSOLE_EXIT 229 sent from the console main thread 170 to the scheduler main thread 160. No return opcode 180 may be required, since a resource manager 108 may be programmed to properly log off or otherwise exit all resources 18 from the system 10.

The INIT_SUCCESS 242 opcode may be sent from the resource manager 108 to the scheduler 110 to instruct the scheduler 110 to complete synchronization, thus ensuring that all queues (message queues of all threads 150) are functioning. Thus, all protocols are properly operating to synchronize messaging between the resource manager 108 and scheduler 110. Initiation opcodes 180 may include INIT_QUEUES 230, although no return opcode 180 may be required.

The INIT_FAIL 244 opcode 180 may be sent by the resource manager 108 when initialization fails. Initiation opcodes 180 may include INIT_QUEUES 230, although no return opcode 180 may be required, similar to the opcode 242.

The SETUP_SUCCESS 246 opcode 180 may be sent when the resource manager 108 is successful in allocating all of the resources requested by the scheduler 110 for a specified test 305. Initiation opcodes 180 may include SETUP_PROGRAM 232 from the scheduler 110, but no return opcode 180 may be required.

The SETUP_FAIL 248 may be sent to the scheduler 110 when an error occurs with respect to information supplied with or associated with the SETUP_PROGRAM 232 opcode 180 received by the resource manager 170. Thus if the request for information identified with a request for preparation with a test 305 is improper, the opcode 232 acts as an initiation opcode 180 for the opcode 248.

The CLEANUP_SUCCESS 250 opcode may be returned when the resource manager 108 has been successful in freeing up the necessary resources 18 identified in data associated with the CLEANUP 234 opcode. Thus, the CLEANUP 234 operates as an initiation opcode 180, although no return opcode 180 may be required. Identification of resources 18, as discussed above, may occur by specification of any or all of several parameters identifying the capacity of a resource 18 required to run a test 305. Similarly, the CLEANUP_FAIL 252 opcode may be returned by the resource manager 108 in response to a CLEANUP 234 opcode. When the resource manager 108 is unable to free up the necessary resources 18 identified in data associated with the opcode 234, the opcode 252 may be appropriate. No return opcodes 180 may be required from the scheduler 110 in response to the opcode 252.

An INCONSISTENT_DATA 254 opcode may be sent by the resource manager 108 when an unrecognized opcode 180 is received. Theoretically, an unrecognized opcode 180 should not occur, particularly in a compiled code or in a previously debugged code. However, the opcode 254 serves as a backup, an initiation opcode 180 being any undefined opcode 180 received by the resource manager 108. No return opcode 180 may be required.

A RESOURCE_REBOOT 256 may be sent when the resource manager 108 detects that a resource 18 has been rebooted. Rebooting should not normally occur, and therefore indicates that a person or program independent of the apparatus 10 has rebooted a resource 18 that was originally logged on to the network 16 as an available resource 18 for the apparatus 10. Also, if a resource 18 has been temporarily enslaved by a controller 12, it may be unloaded (have its software removed) and then be loaded again. Thus, if the slaving software (e.g. NControl™) has been unloaded from the resource 18 in question and then loaded again, the resource 18 has effectively been removed from the apparatus 10 and then replaced. The opcode 256 treats this operation as a reboot. No initiation opcode 180 may be required, since the initiating event may be an outside action, typically by a user, detected by the resource manager 108 upon polling of its resources 18. Possible return opcodes 180 sent by the scheduler 110 in response to the opcode 256 may include CLEANUP 234.

The RESERVE_PENDING 258 opcode may be sent by the resource manager 108 to the scheduler 110 if requested resources 18 are not available to the resource manager 108. The opcode 258 indicates to the scheduler 110 that the resource manager 108 will notify the scheduler 110 when the appropriate resources 18 become available to run the designated test 305. Thus, whenever the resource manager 108 has been unable to locate sufficient resources 18 having the appropriate capabilities to run a test 305, the opcode 258 may be returned. Thereafter, the resource manager 108 waits for sufficient resources 18 to become available to conduct the requested tests 305.

When the resource manager 108 has previously sent a RESERVE_PENDING 258 opcode to the scheduler 110, it may subsequently send a RESERVE_SUCCESS 260 opcode. Thus, whereas an initiation opcode 180 of SETUP_PROGRAM 232 may result in a RESERVE_PENDING 258 opcode from the resource manager 108, no return opcode 180 is sent immediately. Rather, the resource manager 108 simply tracks the resources 18 in view of the pending request, and sends the opcode 260 when the proper resources 18 are available. Thus, once the resource manager 108 has "collected" sufficient resources 18, those resources 18 are designated in the data associated with the opcode 260. Thus, although no initiation opcode 180 or return opcode 180 may be required, a SETUP_PROGRAM 232 may be regarded as a quasi-initiation opcode 180, but cannot control the timing of the opcode 260 being returned.

The RESERVE_REMOVE_SUCCESS 262 may be sent when the resource manager 108 has been able to remove a test reservation (an entry in its table of resources 18 maintained for allocation to tests 305) associated with tests 305, from the launch queue 302. That is, when the resource manager 170 will no longer attempt to reserve resources 18 for a test 305, it may send the opcode 262 without ever devoting those resources 18 to that test 305. The initiation opcode 180 may be a RESERVE_REMOVE 238, although no return opcode 180 may be necessary for the opcode 262 or the opcode 264.

The RESERVE_REMOVE_FAIL 264 opcode may be sent when the resource manager 108 has been unable to remove a test reservation from the table of resources 18 maintained. Thus, the entry may never have existed, or the appropriate resources 18 may have been located and allocated previously, making the initiation opcode 180, opcode 238, unnecessary. No return opcode 180 may be required.

The CLEANUP_LAUNCHER_FAIL_SUCCESS 266 may be sent when the resource manager 108 has successfully freed up those resources 18 to be allocated to a test 305 that previously failed to launch properly. Similarly, the CLEANUP_LAUNCHER_FAIL_FAIL 268 opcode may be sent when the resources 18 have not been successfully freed up. Either opcode 266, 268 may be initiated by the initiation opcode CLEANUP_LAUNCHER_FAIL 236, and may require no return opcode 180.

Several data bases 300 are associated with the data base manager 114 of the automated test harness 10. Each data base 300 may be comprised of a number of records 301, each record 301 containing some number of fields 320 for containing data.

Figure 5:
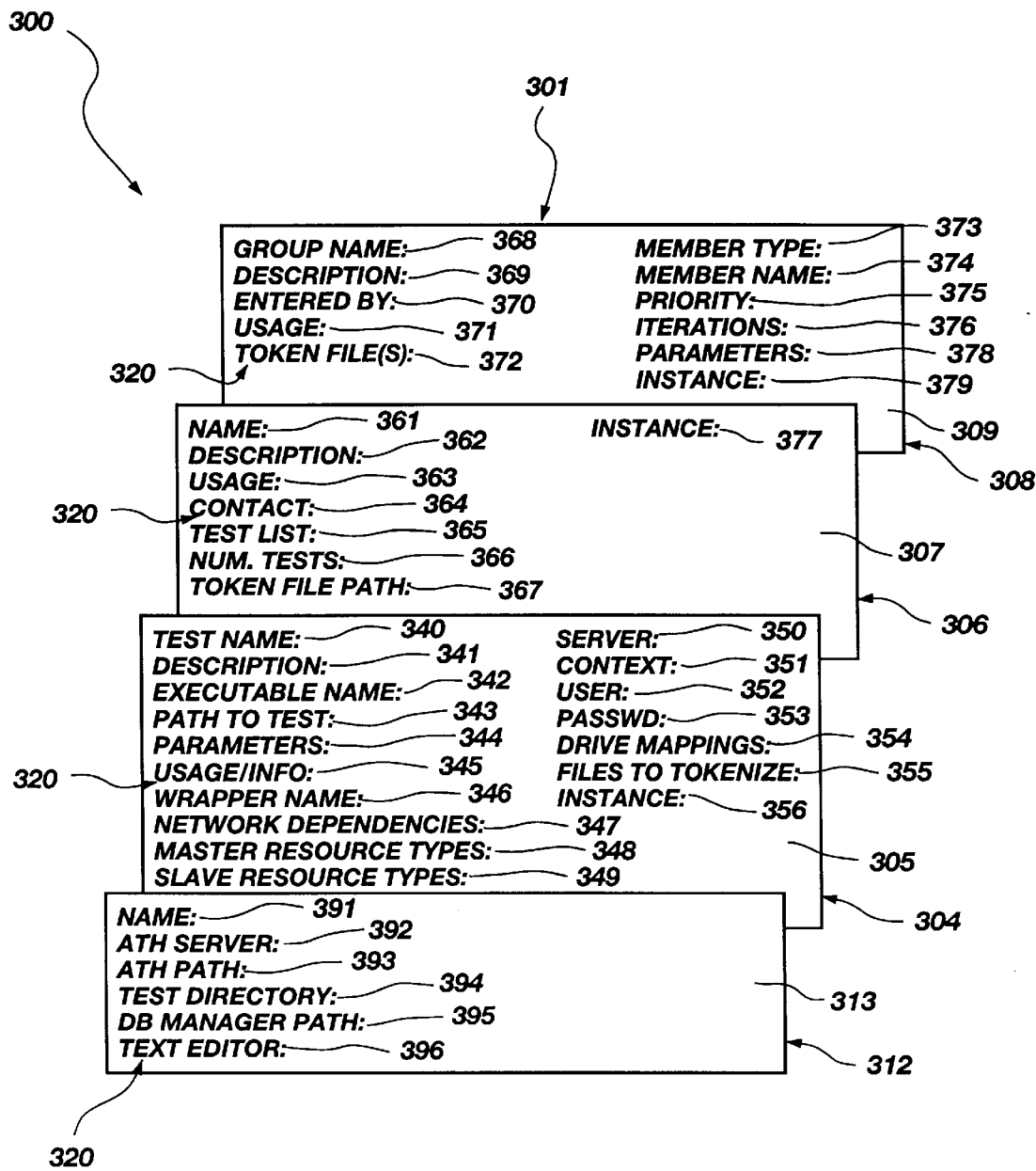
FIGS. 5 and 6 are schematic block diagrams illustrating one embodiment of records of databases accessed by the apparatus of FIG. 1.
Figure 6:
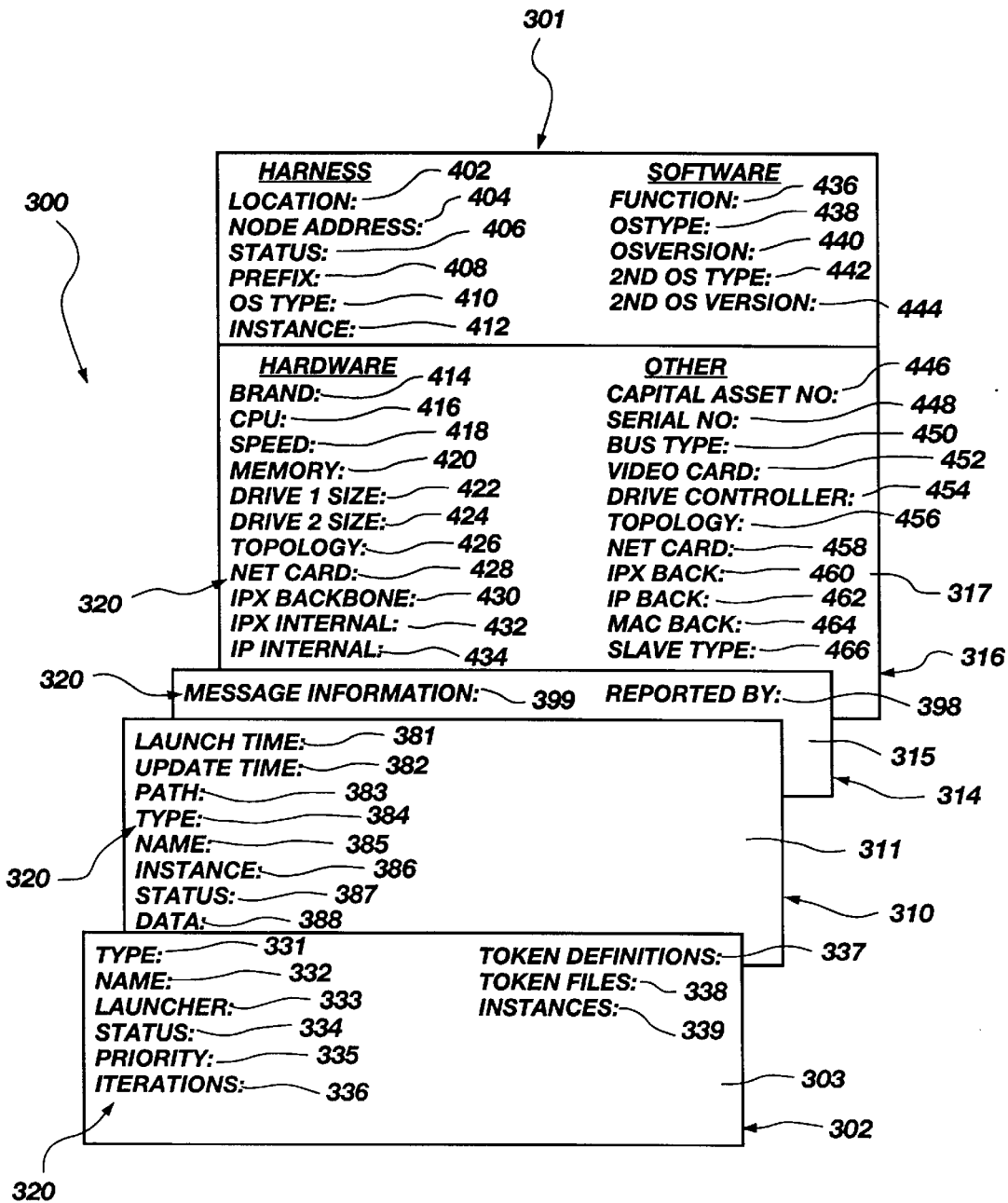

Referring now to FIGS. 5–6, the data bases 300 are designated by a reference number although it is proper to speak of a database 300 or a record 301 in the database 300 interchangeably in certain circumstances. The launch queue data base 302 stores data associated with each launch. A launch may be made by a launcher 112 "spawned" by the scheduler 110 in order to run either a test 305 (actually a test identified by a record 305) from the test data base 304, a suite 307 of tests 305, (identified by the records 307 from the suite data base 306), or a group 309 (or group identified by record 309) of tests 305, suites 307, or groups 309, from the group data base 308. After running a test 305, or a suite 307 or group 309 of tests 305, the automated test harness 10 may store the results in a launch history data base 310. Other data bases 300 or files may be filled with any information desired from a test 305. However, in general, the automated test harness 10 may run any test 305 without regard to what operations are conducted or what data may be generated by the test 305. Thus, a user may determine any number of executable files and output files for a test 305, independent of the automated test harness 10. Thus, the launch history data base 310 concerns primarily the history of the automated test harness 10 and launching and completing tests 305.

To set up the automated test harness 10, certain settings may be saved in a settings data base 312. The settings data base 312 facilitates rapid set-up and reconfiguration of the automated test harness 10, including the controller 12, and any associated hardware and software.

The system log data base 314 may be used to store errors encountered during attempts by the automated test harness 10 to launch and run a test 305 or tests 305.

Information particular to each resource 18 in the apparatus 10 may be stored in a resource data base 316. Thus, when the resource manager 108 seeks resources 18 to run a test 305 scheduled by the scheduler 110, the resource manager 108 may make a determination of the suitability of any resource 18, based on a record 317 of the resource data base 316.

Referring now to FIGS. 5–6, fields 320 in each of the data bases 300 may be configured in a variety of ways. In one presently preferred embodiment of an apparatus 10 made in accordance with the invention, the fields 320 of the launch queue may include a type 331 designating the type of launch, whether a test 305, suite 307, or group 309. A name 332 of the launch may correspond to the test name 340, suite name 361, or group name 368 as appropriate. The launcher 333 indicates the launcher 112 responsible for the test 305 in question. The status 334 may store information relative to the current status in operation of the automated test harness 10 occupied by the launch 332 in question. The priority 335 indicates a designation of importance assigned by a user. Items with lowest priority numbers, highest priority, will be launched first from first received in the launch queue 302 to last received in the launch queue 302, followed by all launches next in priority. The iterations field 336 indicates how many times an individual launch should be run. That is, one may speak of tests 305 or launches 333, but each may refer to an instance 339 corresponding to one instantiation of a launcher 112 tasked by the main thread 160 of the scheduler 110 to slave resources 18, configure those resources 18 to operate, and then emancipate those resources 18 to act in accordance with instructions obtained in consequence of the launcher 112 setting up the resources 18.

Token definitions 337 may be stored in the token definitions field 337 and token files may be identified in the token files field 338. Tokens are those parameters or variables replaceable during any individual operation with specific data, but defined by place holders within a code.

Each record 305 in the test data base 304 may include a test name 340, a description 341, and an executable name 342. A path directing a resource 18 to the actual software to operate a test 305 may be stored at the path field 343, along with parameters 344 for a specific instance 339. Usage information between a programmer and a user may be stored at field 345, while a wrapper name, indicating the designation of a test 305, may be stored in 346. Network dependencies, including types of networks and protocols may be stored in the network dependencies field 347. The type of the controller 12 may be stored at master resource types 348, while resource 18 types may be identified at slave resource types 349. A server 24 may be designated by the server 350 field, whereas the context 351, user 352, and password 353 may be filled with individualized information particular to a user and testing scenario.

The drive mapping 354 field may enable additional drives to be mapped on a computer such as a controller 12 or server 24 on a network 16. The files to tokenize 355 allows each token in a user-specified file to be replaced with a specified value defined elsewhere and stored in memory device 32. The instance 356 may be a unique serial number assigned to each test name 340 and peculiar to the particular instantiation of that test name 340 by a launcher 112.

Similarly, each suite 307 may have a suite name 361, also referred to simply as a name 361, in the name field 361. A text description may be provided in the description field 362, along with instructions for usage in the usage field 363. The individual responsible, typically a user, and possible a directing individual requesting certain testing, may be identified as a contact in the contact field 364. All test names 340 that are included within a suite 361 may be listed, separated by some delimiter, in the test list field 365. The number of tests 305 may be input in number tests field 366, or the number of tests 305 may simply be determined automatically by the coding for reading the delimiters in the test list field 365. To the extent that certain code may be tokenized, a token file path field 367 may be filled with information to direct a resource 18 to the proper token files to fill in dummy variables.

Each group 309 of tests 305, group 309 of suites 307, or group 309 of groups 309, may be assigned a group name in the group name field 368. A description, such as a textual description may be stored in the description field 369. A contact or responsible individual may be identified in the entered by field 370, while usage instructions may be stored in the usage field 371. Similar to the test data base 304 and suite data base 306, token files may be identified in a token file field 372.

Since, unlike the test data base 304 and suite data base 306, the group data base 308 may accept any type of testing grouping, a member type, whether a test 305, suite 307, or group 309, within a group name 368 may be identified in the member type field 373. A name, such as a test name 340, suite name 361, or group name 368, from a test 305, suite 307, or group 309, respectively, associated with the group name 368 in question, may be stored in the member main field 374. A priority may be assigned by a user in the priority field 375, and a group 309 may be repeated, just as a test 305 or suite 307 may be repeated, some number of iterations designated in the iterations field 376. Parameters to be passed may be stored in the parameters field 378, while the instance number unique to the group name 368 and its instantiation by the launcher 112 may be identified by an instance field 379. The instance fields 339, 356, and 379 may be used as indices to associate any testing instantiation with the test data and any record 311 in the launch history data base 310.

The launch history data base 310 may include a launch time set by a clock, and recorded in a launch time field 381, as well as a most recent time in which the record 311 of the data base 310 in question was last updated or stored in an update time field 382. With each instantiation of a launch by the launcher 112, a type may be stored in the type field 384 and a name in the name field 385, corresponding to the type (test 305, suite 307, group 309) and the name 340, 361, 368 corresponding thereto in the name field 385. The corresponding instance 356, 377, 379 may be stored in the instance field 386. Thus, the launch data base 302 may be indexed to the individual test 305, suite 307, or group 309, as is the launch history data base 310. The status field 387 may be used to store information regarding the status of the launch being recorded, while the data field 388 may be used to gather other data pertinent to the individual launch.

The automated test harness data base 312, also referred to as the ATH data base 312, may be used to specify particular, standardized, configurations of the automated test harness 10. Each record 313 of the ATH data base 312 may include a name field 391 for identifying a standardized setup configuration, an automated test harness server identifier in the ATH server field 392, the path in an ATH path field 393, with a test directory or subdirectory for the location of executables associated with a test 305 stored in the test directory field 394. The path to the databases 300 may be specified in the DB manager path field 395, while a text editor of choice may be specified by a user or for a user in the text editor field 396 to enable modification of coding, comments, and other text strings by an appropriate engine.

The system log data base 314 may contain various error messages. In general, however, a message information field 397 may contain the text of a message or additional de-bugging information relating to possible sources of a message, or both. The reported by field 398 may store information regarding a process 106 or a hardware resource 18 responsible for generating a particular error message.

The resources 18 may be specified in substantial detail. Similarly, any particular testing set-up may be provided with a specification for resources 18 according to any or all fields 320 in the resource data base 316.

The resource data base 316 may contain information regarding the automated test harness 10, in general. However, in one embodiment of the apparatus 10 made in accordance with the invention, the resource database 316 contains information touching configuration of the hardware suite employed in the resources 18, and, optionally, the server 24. In addition, certain other information, such as specifications related to peripheral equipment attached to a resource 18, may be significant to an individual laboratory using the automated test harness 10.

General information concerning the automated test harness 10 may include a location field 402 for specifying a geographical location such as a laboratory room number or other geographical identifier. A node address field 404 may store the actual network node address of the controller 12 on the network 16. The status field 406 may identify the state of readiness or configuration, while the prefix field 408 may contain a prefix for uniquely identifying files pertaining to the automated test harness.

The operating system type field 410 may contain information regarding the particular operating system type associated with a controller 12, or may be made to list a number of operating systems that may be hosted by the controller 12. The instance field 412 may temporarily contain one of the instances from an instance field 356, 377, 379 associated with a testing regimen associated with a resource 18 identified by a record 317 in the data base 316. Thus, the instance field 412 does not contain a permanently associated number unique to a resource 18, but rather the designation of the current instance to which the resource 18 is dedicated.

Each of the data bases 302, 304, 306, 308, 310, 312, 314, 316 has associated with it a series of individual records 303, 305, 307, 309, 311, 313, 315, 317, respectively. Each record 303, 305, 307, 309, 311, 313, 315, 317 has associated with it a plurality of fields 320.

Related to the hardware of a resource 18 may be the brand field 414 identifying the actual brand name of the resource 18. The CPU field 416 and the speed field 418 in the record 317 of the resource data base 316 identify exactly the CPU identifying number or name and the speed or megahertz at which the processor 70 of the resource 18 operates.

The drive size field 422 and the drive size field 424 may identify the size and megabytes of hard drives associated with the resource 18. Topology field 426 identified the topology discussed above under which a resource 18 may be connected to the network 16, while the net card field 428 identifies the type of network card 14C, 14B, 14E associated with a particular resource 18.

The IPX backbone field 430 may be the identifier for the network protocol used by the automated test harness 10 for communicating over an internetwork through a router 25 connecting the network 16 to an internetwork 17 (refer to FIG. 1). The IPX internal field 432 and IP internal field 434 may contain identifying numbers, names, or other strings to identify the protocols used within the automated test harness 10 over the network 26 between the network cards 14A, 14B, 14C, 14D, 14E, 14F. IPX is a potential protocol that has been used in various networks, and indicates in general the network protocol of the network 16. Similarly, the IP internal field 434 relates to the internetwork protocol and may be replaced by some other protocol as appropriate.

Relating to the software suite of the automated test harness 10, the function field 436 may contain data relating to software that may be or has been organically hosted on a resource 18. The OS type field 438 and OS version field 440 identify the operating system type as well as the current version number hosted by each resource 18. For some resources 18, operating system types may be changed readily, in which event a second OS field 442 and second OS version field 444 may be used to store information relating to a second operating system under which a resource 18 may operate.

Other information that may be pertinent to a laboratory or organization operating an automated test harness 10 may include a capital asset number field 446 for containing a capital inventory number such as is assigned by most companies in controlling capital assets. Similarly, a machine serial number may be stored in a serial number field 448, while the bus type may be identified in a bus type field 450 and the video card type and drive controller may be designated in a video card field 452 and drive controller field 454.

Alternate topology may be designated by another topology field 456, while an additional network card 14 may be hosted in certain types of systems, such as a wireless card and a wired card, one of which may be a default card. Thus, a net card field 458 may be used to designate an additional network card 14, associated with a resource 18, or an alternative network card 14. Similarly, a network backbone protocol for the network 16 or internetwork 17 may be designated in the IPX back field 460 and the IP back field 462, respectively. Similarly, the data link layer addressing information associated with the MAC-LAYER protocols according to the International Organization for Standardization Open Systems Interconnection model (ISO/OSI) model may be designated in a MAC back field 464. The software associated with the slaving model 446 for slaving the operating system 144 of a resource 18 to the controller 12 of the automated test harness 10, may be specified in a slave type field 466.

Other fields may be created in records 303–317 in the data bases 302–316, respectively, or other new data bases or records may be created as convenient. However, in one embodiment of an apparatus 10 made in accordance with the invention, the foregoing fields 320, records 303–317, and data bases 302–316 may be used to identify data determined to be useful in operating an automated test harness 10.

From the above discussion, it will be appreciated that the present invention provides an apparatus and method for temporarily slaving a resource 18 or target computer 18 to a controller 12, during which event the controller 12 operates as a command line controller communicating with the operating system of the resource 18 to configure the resource 18, and after which the resource 18 may load and run software for conducting tests independently.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for running test software, the apparatus comprising:
    a network for communicating data;
    a target operably connected to the network, the target comprising:
        a first network interface operably connected to the network,
        a first processor connected to the first network interface and provided with a first operating system,
        a first memory device operably connected to a store data transferred to and from the first processor; and
    a controller operably connected to a network to communicate data with the target over the network, the controller comprising:

a second network interface operably connected to the network to communicate data between the controller and the network, a second processor operably connected to the second network interface for selectively, based on resource information received from the target and temporarily providing operating system command line instructions for controlling the operating system of the target, while the operating system of the target is continuously operating, to configure the target, a second memory device for storing data communicated to and from the second processor, and a storage device connected to the network for storing files of data.

2. The apparatus of claim 1 wherein the controller is further provided with a launcher for communicating with the target, and for enslaving and controlling the operating system of the target during a setup operation to configure the target.

3. The apparatus of claim 2 wherein the second processor is programmed to emancipate the target to operate independently after the setup operation, and the target is configured to load and run an application independently of the controller.

4. The apparatus of claim 1 wherein the controller is further provided with a resource manager for managing data corresponding to identification and performance characteristics of the target, and to availability of the target to run applications.

5. The apparatus of claim 1 wherein the controller further comprises a server for storing and retrieving files.

6. The apparatus of claim 5 wherein the files comprise datafiles selected from applications for running on the first processor, control applications containing executables for controlling loading and running of the applications, application datafiles containing data corresponding to parameters used by the first processor in running the applications, and result datafiles containing data corresponding to results output by the first processor while running the applications.

7. The apparatus of claim 1 wherein the controller is further provided with a database manager for storing and retrieving application datafiles and result datafiles communicated between the first processor and the storage device.

8. The apparatus of claim 1 wherein the controller is further provided with a scheduler for acquiring data corresponding to a queue of applications to be run, scheduling to run an application associated with the queue, confirming that all data needed to run the application has been assembled, and monitoring the target to determine completion of running of the application.

9. The apparatus of claim 8 further comprising a database manager for storing, and for retrieving over the network, application datafiles and result datafiles.

10. The apparatus of claim 9 further comprising a resource manager for acquiring and storing data corresponding to identification and characteristics of the target, and to availability of the target to run applications.

11. The apparatus of claim 10 further comprising a launcher for communicating commands to the operating system of the target for configuring the target prior to emancipation of the target to operate independently.

12. The apparatus of claim 11 further comprising a server for transferring files communicated over the network to and from the storage device.

13. The apparatus of claim 1 further comprising a plurality of targets, the target being a first target of the plurality of targets.

14. The apparatus of claim 13 wherein a second target of the plurality of targets is provided with a second operating system different from the first operating system.

15. The apparatus of claim 1 wherein the target further comprises a storage device operably connected to the first processor for storing application datafiles, result datafiles, and applications.

16. The apparatus of claim 1 wherein the target is provided with an operating system for downloading an executable to be run on the first processor.

17. The apparatus of claim 16 wherein the executable is selected from a command file, an interpretable language file, a batch file, and an instruction file written in machine code.

18. The apparatus of claim 1 wherein the target is provided with an operating system for receiving executables downloaded by the controller to be run on the first processor.

19. The apparatus of claim 1 further comprising a second target operably connected to the network and having a second operating system different from the first operating system.

20. The apparatus of claim 1 wherein the second memory device is provided with a plurality of queues for receiving operational codes communicated by a plurality of processes running on the second processor, each operational code being readable by a process of the plurality of processes for controlling an operation of the process.

21. The apparatus of claim 1 wherein the second processor is programmed to run simultaneously a plurality of software modules, the plurality of software modules comprising:

a database manager for storing and retrieving application datafiles to be used as inputs for applications executable by the second processor, and result datafiles containing outputs of the applications;

a resource manager for storing data corresponding to identification, characteristics, and availability of the target to run the applications;

a launcher for communicating with the operating system of the target and for configuring the target to operate independently of the controller in running applications and uploading result files to the server, and for selectively downloading applications to the target and instructing the target to download applications to the target result datafiles to the server; and a scheduler for acquiring data corresponding to applications to be run, selecting applications to be identified to the target for downloading to the target, and for spawning instantiations of the launcher.

22. A method of running software on a plurality of computers, the method comprising:

connecting a target to a network, the target comprising:
a first processor having a first operating system, and
a first network interface operably connected to the processor to communicate data between the processor and the network, connecting a controller to the network to communicate over the network with the first operating system, the controller comprising:

a second network interface operably connected to the network to communicate data between the controller and the network, a second processor having a second operating system and operably connected to the second network interface for selectively, based on resource information received from the target, and temporarily provide operating system command line instructions for controlling the first operating system of the target, and a memory device for storing data communicated to and from the second processor;

connecting a server, containing a storage device, to the network for storing and retrieving files transferred over the network;

enslaving the first operating system of the target to be controlled by the controller;

transmitting operating system command line instructions from the controller to the first operating system of the target to be executed by the first operating system of the target to configure the target;

emancipating the first operating system of the target to operate independently of the controller; and loading by the target, independently of the controller, a file from the server onto the target.

23. The method of claim 22 wherein the first operating system and the second operating system are different from each other.

24. The method of claim 22 further comprising running an application of the applications on the first processor.

25. The method of claim 24, further comprising creating by the target a result datafile containing data corresponding to results obtained by the first processor while running the applications.

26. The method of claim 25, further comprising independently uploading by the target the result datafile to the server.

27. The method of claim 22 wherein the file is selected from applications containing instructions executable by the first processor, control applications containing instructions executable by the first processor for controlling running of applications, a batch file interpretable by the first operating system, and application datafiles containing data corresponding to parameters used by the first processor in running applications.

* * * * *

UNITED STATES PATENT AND TRADEMARK OFFICE
CERTIFICATE OF CORRECTION

PATENT NO. : 5,909,544
DATED : June 1, 1999
INVENTOR(S) : Graham et al.

It is certified that error appears in the above-indentified patent and that said Letters Patent is hereby corrected as shown below:

On the title page section [75] Inventors please delete "Micheil" and insert therefor --Michiel--.

Signed and Sealed this

Sixteenth Day of November, 1999

Attest:

Q. TODD DICKINSON

*Attesting Officer*  *Acting Commissioner of Patents and Trademarks*